United States Patent
Badam et al.

(10) Patent No.: US 9,355,023 B2
(45) Date of Patent: May 31, 2016

(54) VIRTUAL ADDRESS PAGER AND METHOD FOR USE WITH A BULK ERASE MEMORY

(76) Inventors: Anirudh Badam, Princeton, NJ (US); Vivek Pai, Princeton, NJ (US)

(\*) Notice: Subject to any disclaimer, the term of this patent is extended or adjusted under 35 U.S.C. 154(b) by 339 days.

(21) Appl. No.: 13/421,007

(22) Filed: Mar. 15, 2012

(65) Prior Publication Data

US 2012/0239871 A1    Sep. 20, 2012

Related U.S. Application Data

(60) Provisional application No. 61/452,955, filed on Mar. 15, 2011.

(51) Int. Cl.
G06F 12/02        (2006.01)
G06F 12/14        (2006.01)

(52) U.S. Cl.
CPC ........ *G06F 12/0246* (2013.01); *G06F 12/1425* (2013.01)

(58) Field of Classification Search
None
See application file for complete search history.

(56) References Cited

U.S. PATENT DOCUMENTS

| | | | |
|---|---|---|---|
| 2009/0248959 A1* | 10/2009 | Tzeng | 711/103 |
| 2011/0208900 A1* | 8/2011 | Schuette et al. | 711/103 |
| 2012/0059978 A1* | 3/2012 | Rosenband et al. | 711/103 |
| 2012/0096217 A1* | 4/2012 | Son et al. | 711/103 |

OTHER PUBLICATIONS

Lvin et al., "Archipelago: Trading Address Space for Reliability and Security", ASPLOS'08, Mar. 2008.*
Boost Version 1.46.0, . http://www.boost.org/users/history, Feb. 21, 2011.
Calibrator, . http://homepages.cwi.nl/~manegold/Calibrator/, Jun. 24, 2004.
Scaling Memcached at Facebook, . http://www.facebook.com/note.php?note_id=39391378919, Dec. 12, 2008.
Memcached, . http://www.danga.com/memcached/, 2003.
Ptmalloc, . http://www.malloc.de/en/, Jun. 5, 2006.
A. Anand, C. Muthukrishnan, S. Kappes, A. Akella, and S. Nath. Cheap and Large CAMs for High Performance Data-Intensive Networked Systems. In Proc. 7th USENIX NSDI, San Jose, CA, Apr. 2010.
D. G. Andersen, J. Franklin, M. Kaminsky, A. Phanishayee, L. Tan, and V. Vasudevan. FAWN: A fast array of wimpy nodes. In Proc. 22nd ACM Symposium on Operating Systems Principles (SOSP), Big Sky, MT, Oct. 2009.

(Continued)

*Primary Examiner* — Gary Portka
(74) *Attorney, Agent, or Firm* — Meagher Emanuel Laks Goldberg & Liao, LLP

(57) ABSTRACT

A virtual address pager and method for use with a bulk erase memory is disclosed. The virtual address pager includes a page protection controller configured with a heap manager interface configured to receive only bulk erase memory-backed page requests for a plurality of memory pages. A RAM object cache controller is configured to store and bulk write data for a portion of the bulk erase memory. The page protection controller may have an operating system interface configured to generate a page memory access permission for each of the plurality of memory pages. The page protection controller may be configured to receive a virtual memory allocation request and generate the page memory access permission based on the virtual memory allocation request.

27 Claims, 13 Drawing Sheets

(56) References Cited

OTHER PUBLICATIONS

A. Badam and V. S. Pai. Beating Netbooks into Servers: Making Some Computers More Equal Than Others. In Proc. 3rd ACM Workshop on Networked Systems for Developing Regions (NSDR), BigSky, MO, 2009.

A. Badam, K. Park, V. S. Pai, and L. L. Peterson. Hashcache: Cache storage for the next billion. In Proc. 6th USENIX NSDI, Boston, MA, Apr. 2009.

M. Baker, S. Asami, E. Deprit, J. Ousterhout, and M. Seltzer. Nonvolatile memory for fast, reliable file systems. In Proc. ASPLOS' 92, 1992.

A. Birrell, M. Isard, C. Thacker, and T. Wobber. A design for high-performance flash disks. Operating Systems Review, 42(2): 88-93, 2007.

M. Castro, A. Adya, B. Liskov, and A. C. Myers. Hac: Hybrid adaptive caching for distributed storage systems. In Proc. 16th ACM Symposium on Operating Systems Principles (SOSP), Saint-Malo, France, Oct. 1997.

J. Condit, E. B. Nightingale, C. Frost, E. Ipek, D. Burger, B. Lee, and D. Coetzee. Better I/O Through Byte-Addressable, Persistent Memory. In Proc. 22nd ACM Symposium on Operating Systems Principles (SOSP), Big Sky, MT, Oct. 2009.

B. Debnath, S. Sengupta, and J. Li. Chunkstash: Speeding up inline storage deduplication using flash memory. In Proc. USENIX Annual Technical Conference, Boston, MA, Jun. 2010.

P. V. der Linder. Expert C Programming: Deep C Secrets. Prentice Hall, Englewood Cliffs, N.J, 1994.

S. Ihm, K. Park, and V. S. Pai. Wide-area Network Acceleration for the Developing World. In Proc. USENIX Annual Technical Conference, Boston, MA, Jun. 2010.

T. Kgil and T. N. Mudge. Flashcache: A NAND flash memory file cache for low power web servers. In Proc. of CASES'06, 2006.

S. Ko, S. Jun, Y. Ryu, O. Kwon, and K. Koh. A New Linux Swap System for Flash Memory Storage Devices. In in ICCSA'09, 2008.

S.-W. Lee, B. Moon, C. Park, J.-M. Kim, and S.-W. Kim. A case for flash memory SSD in enterprise database applications. In Proc. ACM SIGMOD, Vancouver, BC, Canada, Jun. 2008.

J. C. Mogul, E. Argollo, M. Shah, and P. Faraboschi. Operating system support for NVM+DRAM hybrind main memory. In Proc. HotOS XII, Monte Verita, Switzerland, May 2009.

D. Narayanan, E. Thereska, A. Donelly, S. Elnikety, and A. Rowstron. Migrating server storage to ssds, analysis of tradeoffs. In Proceedings of EuroSys'09, 2009.

M. Rosenblum and J. K. Ousterhout. The design and implementation of a log-structured file system. ACM Transactions on Computer Systems, 10(1):26-52, 1992.

M. Saxena and M. M. Swift. Flashvm: Virtual memory management on flash. In Proc. USENIX Annual Technical Conference, Boston, MA, Jun. 2010.

C.-H. Wu, L.-P. Chang, and T.-W. Kuo. An efficient b-tree layer for flash-memory storage systems. In Proceedings of RTCSA'04, 2004.

M. Wu and W. Zwaenepoel. eNVy: A non-volatile, main memory storage system. In Proc. 6th International Conf. on Architectural Support for Programming Languages and Operating Systems (ASPLOS), San Jose, CA, Oct. 1994.

\* cited by examiner (a) Throughput Vs. Allocation Style (X25-E)

(b) Throughput Vs. Allocation Style (50% Reads)

(c) Write Efficiency Vs. Allocation Style (a) Throughput Vs. Num Instances (50% get)

(b) Throughput Vs. Object Size (50% get)

(c) Gain over SSD-Swap (50% get)

(a) Response Time Vs. Packet Size (b) Response Time Vs. Key Size

VIRTUAL ADDRESS PAGER AND METHOD FOR USE WITH A BULK ERASE MEMORY

CROSS-REFERENCE TO PRIOR FILED APPLICATION

This application claims priority to earlier filed U.S. provisional patent application No. 61/452,955 filed on Mar. 15, 2011, which is herein incorporated by reference in its entirety.

GOVERNMENT RIGHTS IN THIS INVENTION

This invention was made with government support under Grants CNS-0615237, CNS-0916204, and CNS-0519829 awarded by National Science Foundation. The government has certain rights in this invention.

FIELD OF THE INVENTION

This invention relates to apparatus and methods for virtual memory management.

BACKGROUND

An increasing number of networked systems today rely on in-memory (DRAM) indexes, hashtables, caches and key-value storage systems for scaling the performance and reducing the pressure on their secondary storage devices. Unfortunately, the cost of DRAM increases dramatically beyond 64 GB per server, jumping from a few thousand dollars to tens of thousands of dollars fairly quickly; power requirements scale similarly, restricting applications with large workloads from obtaining high in-memory hit-rates that are vital for high-performance.

Bulk erase memory such as flash memory can be leveraged (by augmenting DRAM with flash backed memory) to scale the performance of such applications. Flash memory has a larger capacity, lower cost and lower power requirement when compared to DRAM and a great random read performance, which makes it well suited for building such applications. Solid State Disks (SSD) in the form of NAND flash have become increasingly popular due to pricing. 256 GB SSDs are currently around $700, and multiple SSDs can be placed in one server. As a result, high-end systems could easily augment their 64-128 GB RAM with 1-2 TB of SSD.

Flash is currently being used as program memory via two methods—by using flash as an operating system (OS) swap layer or by building a custom object store on top of flash. Swap layer, which works at a page granularity, reduces the performance and also undermines the lifetime of flash for applications with many random accesses (typical of the applications mentioned). For every application object that is read/written (however small) an entire page of flash is read/dirtied leading to an unnecessary increase in the read bandwidth and the number of flash writes (which reduce the lifetime of flash memory). Applications are often modified to obtain high performance and good lifetime from flash memory by addressing these issues. Such modifications not only need a deep application knowledge but also require an expertise with flash memory, hindering a wide-scale adoption of flash. It is, therefore, necessary to expose flash via a swap like interface (via virtual memory) while being able to provide performance comparable to that of applications redesigned to be flash-aware.

SUMMARY OF THE INVENTION

A virtual address pager and method for use with a bulk erase memory is disclosed. The virtual address pager includes a page protection controller configured with a heap manager interface configured to receive only bulk erase memory-backed page requests for a plurality of memory pages. A RAM object cache controller is configured to store and bulk write data for a portion of the bulk erase memory. The page protection controller may have an operating system interface configured to generate a page memory access permission for each of the plurality of memory pages. The page protection controller may be configured to receive a virtual memory allocation request and generate the page memory access permission based on the virtual memory allocation request.

The virtual address pager may also include a page buffer controller configured to populate a portion of a page based on the virtual memory allocation request. The page buffer controller may be configured to deallocate the page and store in the RAM object cache controller only the portion of the page specified by the virtual memory allocation request. The virtual memory allocation request may include an object size and the page buffer controller may be configured to populate the page based on the object size. The page may have a size and the may be object size is less than the page size. The page buffer controller may be configured to deallocate the page based on the object size.

The page buffer controller is configured to communicate with a page buffer. The RAM object cache controller is configured to communicate with a RAM object cache. The RAM object cache may be configured larger than the page buffer. The populated portion of the page may be blank for a first access or a verbatim copy of object contents from when the page was last deallocated. The virtual address pager may be implemented in an application, in libraries linked to the application, in a separate process communicating with the application or within an operating system or variations thereof. The bulk erase memory may be configured as a log structured store.

DETAILED DESCRIPTION OF THE INVENTION

Figure 1A:
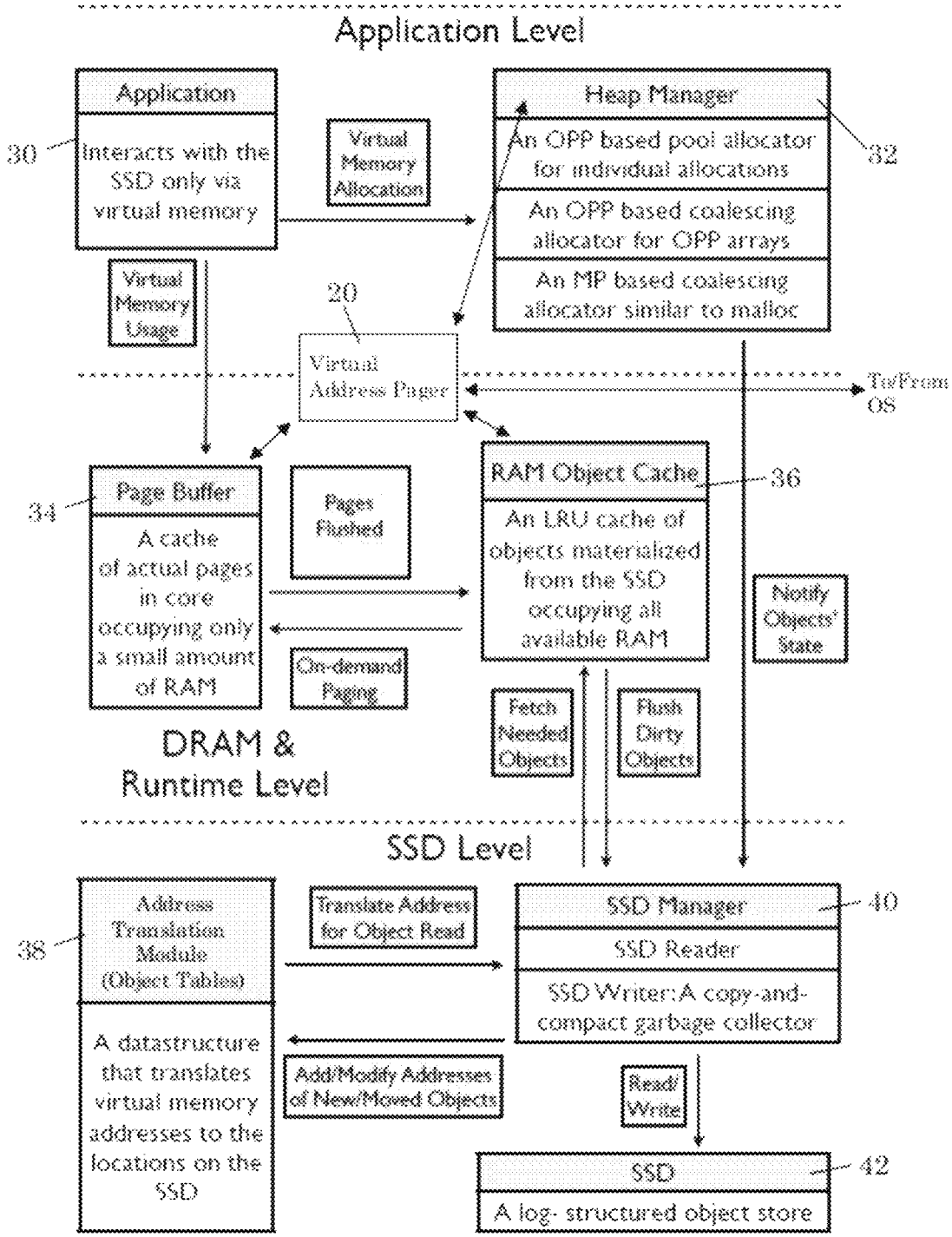
FIG. 1A is a system block diagram.
Figure 1B:
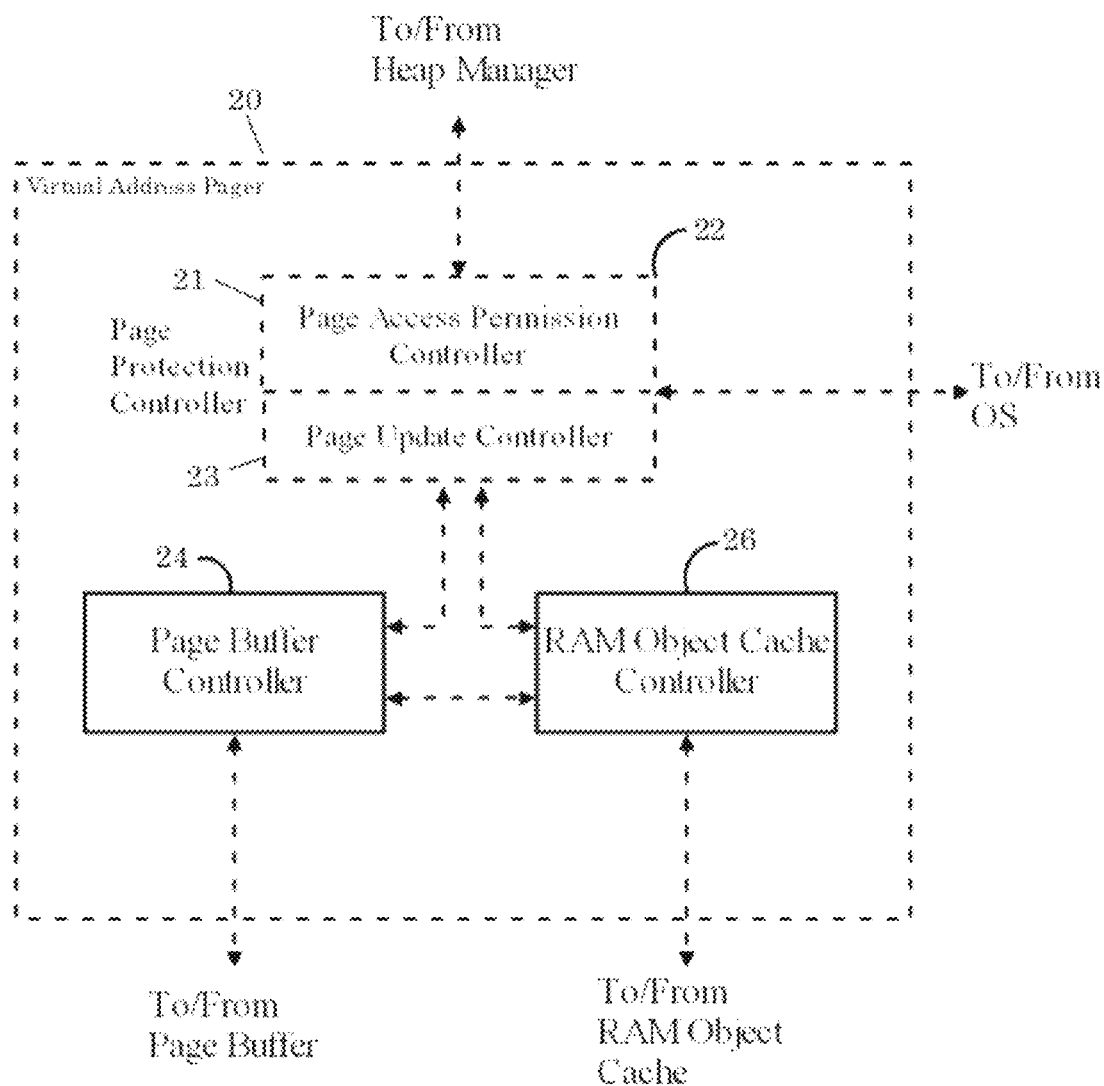
FIG. 1B is a is a block diagram of a virtual address pager.

This disclosure is directed to a virtual address pager configured for use with a bulk erase memory (such as an SSD). The virtual address pager may be implemented in an application, in libraries linked to the application, in a separate process communicating with the application or within the operating system itself or variations thereof. As shown in FIGS. 1A and 1B, the virtual address pager 20 is configured to communicate with a heap manager 32 via a heap manager interface. The virtual address pager 20 is configured to receive from the heap manager only bulk erase memory-backed, e.g., SSD-backed, page requests for a plurality of memory pages. The virtual address pager 20 generally includes a page protection controller 22 having an operating system interface configured to generate page memory access permissions for each of the plurality of virtual memory pages. In general, each virtual memory page has an associated permission, e.g., read only, read/write. The page protection controller 22 may be configured with a page access permission controller 21 and a page update controller 23.

The page access permission controller 21 is generally configured to receive virtual memory allocation requests from the operating system and generate page memory access permission based on the virtual memory allocation. The page update controller is generally configured receive memory protection faults or signals from the operating system. The virtual address pager 20 also includes a page buffer controller 24 and a RAM object cache controller 26. In general, the page buffer controller 24 is configured to communicate with the page buffer 34. The RAM object cache controller 26 is generally configured to communicate with the RAM object cache 36. The heap manager 32 and RAM object cache 36 are generally configured to communicate with the bulk erase device, e.g., SSD 42, via SSD manager 40. SSD manager 40 is configured to format the SSD as a log structured store. The SSD manager intentionally avoids in-place updates of existing objects.

The page buffer controller is generally configured to populate a portion of a page based on the virtual memory allocation request. The populated portion of the page will generally be blank for the first access or a verbatim copy of the contents of the object from when the page was last deallocated. Since no modifications of any pointer in the object are required, standard C-style applications that employ direct pointer access will function without modification. The page buffer controller is also configured to deallocate pages and store in the RAM object cache controller only the portion of the page specified by the virtual memory allocation request. The RAM object cache controller 26 configured to store and bulk write data for a portion of the bulk erase memory.

Various operational modes are discussed below, e.g., Memory Pages (MP) mode and Object Per Page (OPP) mode. The virtual memory allocation request generally includes an object size and the page buffer controller is configured to populate the page based on the object size. In OPP mode, the object size may be less than the page size. This results in less data transfer to bulk erase memory for read and write operations, extending the lifetime of the bulk erase memory and increasing the performance as measured in operations per second. The page buffer controller 24 may be configured to deallocate the page based on the object size. The RAM object cache 36 may be larger than the page buffer 34.

The structure disclosed above was implemented as memory managers with support for MP and OPP modes. For example, SSDAlloc, a hybrid DRAM/flash memory manager and a runtime library allows applications to fully utilize the potential of flash (large capacity, low cost, fast random reads and non-volatility) in a transparent manner. SSDAlloc exposes flash memory via the familiar page-based virtual memory manager interface, but internally, it works at an object granularity for obtaining high performance and for maximizing the lifetime of flash memory. SSDAlloc's memory manager is compatible with the standard C programming paradigms and it works entirely via the virtual memory system. Unlike object databases, applications do not have to declare their intention to use data, nor do they have to perform indirections through custom handles. All data maintains its virtual memory address for its lifetime and can be accessed using standard pointers. Pointer swizzling or other fix-ups are not required.

SSDAlloc's memory allocator looks and feels much like the malloc memory manager. When malloc is directly replaced with SSDAlloc's memory manager, flash is used as a fully log-structured page store. However, when SSDAlloc is provided with the additional information of the size of the application object being allocated, flash is managed as a log-structured object store. It utilizes the object size information to provide the applications with benefits that are otherwise unavailable via existing transparent programming techniques. Using SSDAlloc, four systems built originally using malloc were modified: memcached (a key-value store), a Boost based B+Tree index, a packet cache backend (for accelerating network links using packet level caching), and the HashCache cache index.

TABLE 1

| Application | Original LOC | Edited LOC | Throughput Gain vs SSD Swap Unmodified | Throughput Gain vs SSD Swap Write Log |
|---|---|---|---|---|
| Memcached | 11,193 | 21 | 5.5-17.4x | 1.4-3.5x |
| B+Tree Index | 477 | 15 | 4.3-12.7x | 1.4-3.2x |
| Packet Cache | 1,540 | 9 | 4.8-10.1x | 1.3-2.3x |
| HashCache | 20,096 | 36 | 5.3-17.1x | 1.3-3.3x |

Table 1 shows that SSDAlloc requires changing only the memory allocation code, typically only tens of lines of code (LOC). Depending on the SSD used, throughput gains can be as high as 17 times greater than using the SSD as swap. Even if the swap is optimized for SSD usage, gains can be as high as 3.5x.

As shown in Table 1, all four systems show great benefits when using SSDAlloc with object size information—
- 4.3-17.4 times faster than when using the SSD as a swap space.
- 1.3-3.5 times faster than when using the SSD as a log-structured swap space.
- Only 9-36 lines of code are modified (malloc replaced by SSDAlloc).
- Up to 31.2 times less data written to the SSD for the same workload (SSDAlloc works at an object granularity).

While alternative memory technologies have been championed for more than a decade, their attractiveness has increased recently as the gap between the processor speed and the disk widened, and as their costs dropped. This disclosure provides a transparent interface to using flash memory (unlike the application redesign strategy) while acting in a flash-aware manner to obtain better performance and lifetime from the flash device (unlike the operating system swap).

Existing transparent approaches to using flash memory cannot fully exploit flash's performance for two reasons: 1) Accesses to flash happen at a page granularity (4 KB), leading to a full page read/write to flash for every access within that page. The write/erase behavior of flash memory often has different expectations on usage, leading to a poor performance. Full pages containing dirty objects have to be written to flash. This behavior leads to write escalation which is bad not only for performance but also for the durability of the flash device. 2) If the application objects are small compared to the page size, only a small fraction of RAM contains useful objects because of caching at a page granularity. Integrating flash as a filesystem cache can increase performance, but the cost/benefit tradeoff of this approach has been questioned before.

FlashVM is a system that proposes using flash as a dedicated swap device, that provides hints to the SSD for better garbage collection by batching writes, erases and discards. For example, it is possible to use 16-32 times more flash than DRAM and in those settings, FlashVM style heuristic batching/aggregating of in-place writes might be of little use purely because of the high write randomness that our targeted applications have. A fully log-structured system would be needed for minimizing erases in such cases. A fully log-structured swap was built and used as a comparison point, along with native Linux swap, against the SSDAlloc system that works at an object granularity.

Others have proposed redesigning applications to use flash-aware data structures to explicitly handle the asymmetric read/write behavior of flash. Redesigned applications range from databases (BTrees) and Web servers to indexes and key-value stores. Working set objects are cached in RAM more efficiently and the application aggregates objects when writing to flash. While the benefits of this approach can be significant, the costs involved and the extra development effort (requires expertise with the application and flash behavior) are high enough that it may deter most application developers from going this route.

This disclosure provides the right set of interfaces (via memory allocators), so that both existing applications and new applications can be easily adapted to use flash. The disclosed approach focuses on exposing flash only via a page based virtual memory interface while internally working at an object level. Distributed object systems can switch between pages and objects when convenient using custom object handlers. It is desirable to avoid using any custom pointer/handler mechanisms to eliminate intrusive application changes.

Additionally, the disclosed approach can improve the cost/benefit ratio of flash-based approaches. If only a few lines of memory allocation code need to be modified to migrate an existing application to a flash-enabled one with performance comparable to that of flash-aware application redesign, this one-time development cost is low compared to the cost of high-density memory. For example, the cost of 1 TB of high-density RAM adds roughly $100K USD to the $14K base price of the system (e.g., the Dell PowerEdge R910). In comparison, a high-end 320 GB SSD sells for $3200 USD, so roughly 4 servers with 5 TB of flash memory cost the same as 1 server with 1 TB of RAM.

TABLE 2

| SSD Usage Technique | Write Logging | Read/Write < a page | Garbage Collects Dead pages/data | Avoids DRAM Pollution | Persistent Data | High Performance | Programming Ease |
| --- | --- | --- | --- | --- | --- | --- | --- |
| SSD Swap | | | | | | | ✓ |
| SSD Swap (Write Logged) | ✓ | | | | | | ✓ |
| SSD mmap | | | | | ✓ | | ✓ |
| Application Rewrite | ✓ | ✓ | ✓ | ✓ | ✓ | ✓ | |
| SSDAlloc | ✓ | ✓ | ✓ | ✓ | ✓ | ✓ | ✓ |

Table 2 shows that while using SSDs via swap/mmap is simple, they achieve only a fraction of the SSD's performance. Rewriting applications can achieve greater performance but at a high developer cost. SSDAlloc provides simplicity while providing high performance.

TABLE 3

| | reads/sec | | writes/sec | |
| --- | --- | --- | --- | --- |
| SSD Make | 4 KB | 0.5 KB | 4 KB | 0.5 KB |
| RiDATA (32 GB) | 3,200 | 3,700 | 500 | 675 |
| Kingston (64 GB) | 3,300 | 4,200 | 1,800 | 2,000 |
| Intel X25-E (32 GB) | 26,000 | 44,000 | 2,200 | 2,700 |
| Intel X25-V (40 GB) | 27,000 | 46,000 | 2,400 | 2,600 |
| Intel X25-M (80 GB) | 29,000 | 49,000 | 2,300 | 2,500 |

Table 3 shows that SSDAlloc can take full advantage of object-sized accesses to the SSD, which can often provide significant performance gains over page-sized operations.

SSDAlloc's Design

This portion of the disclosure describes the design of SSDAlloc. The description start with the networked systems' requirements from a hybrid DRAM/SSD setting for high performance and ease of programming. The high level goals for integrating bulk erase memory such as SSDs into these applications are:

To present a simple interface such that the applications can be run mostly unmodified—Applications should use the same programming style and interfaces as before (via virtual memory managers), which means that objects, once allocated, always appear to the application at the same locations in the virtual memory.

To utilize the DRAM in the system as efficiently as possible—Since most of the applications it is desirable to focus on allocate large number of objects and operate over them with little locality of reference, the system should be no worse at using DRAM than a custom DRAM based object cache that efficiently packs as many hot objects in DRAM as possible.

To maximize the SSD's utility—Since the SSD's read performance and especially the write performance suffer with the amount of data transferred, the system should minimize data transfers and (most importantly) avoid random writes.

SSDAlloc employs many clever design decisions and policies to meet our high level goals. The sections below describe a page-based virtual memory system using a modified heap manager in combination with a user-space on-demand page materialization runtime that appears to be a normal virtual memory system to the application. In reality, the virtual memory pages are materialized in an on-demand fashion from the SSD by intercepting page faults. To make this interception as precise as possible, our allocator aligns the application level objects to always start at page boundaries. Such a fine grained interception allows our system to act at an application object granularity and thereby increases the efficiency of reads, writes and garbage collection on the SSD. It also helps in the design of a system that can easily serialize the application's objects to the persistent storage for a subsequent usage.

The disclosure herein also describes how to use the DRAM efficiently. Since most of the application's objects are smaller than a page, it makes no sense to use all of the DRAM as a page cache. Instead, most of DRAM is filled with an object cache, which packs multiple useful objects per page, and one which is not directly accessible to the application. When the application needs a page, it is dynamically materialized, either from the object cache or from the SSD.

The disclosure herein also describes how to manage the SSD as an efficient log-structured object store. In order to reduce the amount of data read/written to the SSD, the system uses the object size information, given to the memory allocator by the application, to transfer only the objects, and not whole pages containing them. Since the objects can be of arbitrary sizes, packing them together and writing them in a log not only reduces the write volume, but also increase the SSD's lifetime. Table 2 presents an overview of various techniques by which SSDs are used as program memory today and provides a comparison to SSDAlloc by enumerating the high-level goals that each technique satisfies. The design description follows in detail starting with virtual address allocation policies.

SSDAlloc's Virtual Memory Structure

SSDAlloc ideally wants to non-intrusively observe what objects the application reads and writes. The virtual memory (VM) system provides an easy way to detect what pages have been read or written, but there is no easy way to detect at a finer granularity. Performing copy-on-write and comparing the copy with the original can be used for detecting changes, but no easy mechanism determines what parts of a page were read. Instead, SSDAlloc uses the observation that virtual address space is relatively inexpensive compared to actual DRAM, and reorganizes the behavior of memory allocation to use the VM system to observe object behavior. Servers typically expose 48 bit address spaces (256 TB) while supporting less than 1 TB of physical RAM, so virtual addresses are at least 256× more plentiful.

Using the Object Per Page (OPP) model, if an application requests memory for an object, the object is placed on its own page of virtual memory, yielding a single page for small objects, or more (contiguous) when the object exceeds the page size. The object is always placed at the start of the page and the rest of the page is not utilized for memory allocation. In reality, however, it is possible to employ various optimizations (described below) to eliminate the physical memory wastage that can occur because of such a lavish virtual memory usage. An OPP memory manager can be implemented just by maintaining a pool of pages (details of the actual memory manager used are set out below). OPP is suitable for individual object allocations. OPP objects are stored on the SSD in a log-structured manner (details are explained below). Additionally, using virtual memory based page-usage information, it is possible to accurately determine which objects are being read and written (since there is only one object per page). However, it is not straightforward to use arrays of objects in this manner. In an OPP array, each object is separated by the page's size as opposed to the object's size. While it is possible to allocate OPP arrays in such a manner, it would require some code modifications to be able to use arrays in which objects separated by page boundaries as opposed being separated by object boundaries. The disclosure below describes how an OPP based coalescing allocator can be used to allocate OPP based arrays.

As shown in FIG. 1, SSDAlloc uses most of RAM as an object-level cache, and materializes/dematerializes pages as needed to satisfy the application's page usage. This approach improves RAM utilization, even though many objects will be spread across a greater range of virtual address space.

Contiguous Array Allocations

In the C programming language, array allocations via malloc/calloc expect array elements to be contiguous. One option, called Memory Pages (MP), can be used to do this. In MP, when the application asks for a certain amount of memory, SSDAlloc returns a pointer to a region of virtual address space with the size requested. It is possible to use a ptmalloc style coalescing memory manager (further explained below) built on top of bulk allocated virtual memory pages (via brk) to obtain a system which can allocate C style arrays. Internally, however, the pages in this space are treated like page sized OPP objects. For the rest of the paper, MP pages are treated as page sized OPP objects.

While the design of OPP efficiently leverages the virtual memory system's page level usage information to determine application object behavior, it could lead to DRAM space wastage because the rest of the page beyond the object would not be used. To eliminate this wastage, it is possible to organize the physical memory such that only a small portion of DRAM contains actual materializations of OPP pages (Page Buffer) while the rest of the available DRAM is used as a compact hot object cache.

SSDAlloc's Physical Memory Structure

The SSDAlloc runtime system eases application transparency by allowing objects to maintain the same virtual address over their lifetimes, while their physical location may be in a temporarily-materialized physical page mapped to its virtual memory page in the Page Buffer, the RAM Object Cache, or the SSD. Not only does the runtime materialize physical pages as needed, but it also reclaims them when their usage drops. A description of how objects are cached compactly in DRAM is set forth below.

RAM Object Cache—Objects are cached in RAM object cache in a compact manner. RAM object cache occupies available portion of DRAM while only a small part of DRAM is use for pages that are currently in use (shown in FIG. 1). This decision provides several benefits—1) Objects cached in RAM can be accessed much faster than the SSD, 2) By performing usage-based caching of objects instead of pages, the relatively small RAM can cache more useful objects when using OPP, and 3) Given the density trends of SSD and RAM, object caching is likely to continue being a useful optimization going forward.

RAM object cache is maintained in LRU fashion. It indexes objects using their virtual memory page address as the key. An OPP object in RAM object cache is indexed by its OPP page address, while an MP page (a 4 KB OPP object) is indexed with its MP page address. In one implementation, a hashtable with the page address as the key is used. Clean objects being evicted from the RAM object cache are deallocated while dirty objects being evicted are enqueued to the SSD writer mechanism (shown in FIG. 1).

Page Buffer—Temporarily materialized pages (in physical memory) are collectively known as the Page Buffer. These pages are materialized in an on-demand fashion (described below). Page Buffer size is application configurable, but in most of the applications tested, it was found that a Page Buffer of size less than 25 MB was sufficient to bring down the rate of page materializations per second to the throughput of the application. However, regardless of the size of the Page Buffer, physical memory wastage from using OPP has to be minimized. To minimize this wastage the rest of the active OPP physical page (portion beyond the object) can be made a part of the RAM object cache. RAM object cache is implemented such that the shards of pages that materialize into physical memory are used for caching objects.

SSDAlloc's Paging—For a simple user space implementation it is possible to implement the Page Buffer via memory protection. All virtual memory allocated using SSDAlloc is protected (via mprotect). A page usage is detected when the protection mechanism triggers a fault. The required page is then unprotected (only read or write access is given depending on the type of fault to be able to detect writes separately) and its data is then populated in the seg-fault handler—an OPP page is populated by fetching the object from RAM object cache or the SSD and placing it at the front of the page. An MP page is populated with a copy of the page (a page sized object) from RAM object cache or the SSD.

Pages dematerialized from Page Buffer are converted to objects. Those objects are pushed into the RAM object cache, the page is then madvised to be not needed and finally, the page is reprotected (via mprotect)—in case of OPP/MP the object/page is marked as dirty if the page faults on a write.

Page Buffer can be managed in many ways, with the simplest way being FIFO. Page Buffer pages are unprotected, so our user space implementation based runtime would have no information about how a page would be used while it remains in the Page Buffer, making LRU difficult to implement. For simplicity, FIFO is used in one implementation. The only penalty is that if a dematerialized page is needed again then the page has to be rematerialized from RAM.

OPP can have more virtual memory usage than malloc for the same amount of data allocated. While MP will round each virtual address allocation to the next highest page size, the OPP model allocates one object per page. For 48-bit address spaces, the total number of pages is $2^{36}$ (~64 Billion objects via OPP). For 32-bit systems, the corresponding number is $2^{20}$ (~1 million objects). Programs that need to allocate more objects on 32-bit systems can use MP instead of OPP. Furthermore, SSDAlloc can coexist with standard malloc, so address space usage can be tuned by moving only necessary allocations to OPP.

While the separation between virtual memory and physical memory presents many avenues for DRAM optimization, it does not directly optimize SSD usage. Example SSD organization is disclosed below.

SSDAlloc's SSD Maintenance

To overcome the limitations on random write behavior with SSDs, SSDAlloc writes the dirty objects when flushing the RAM object cache to the SSD in a log-structured manner. This means that the objects have no fixed storage location on the SSD—similar to flash-based filesystems. A description of how to manage the mapping between fixed virtual address spaces to ever-changing log-structured SSD locations is set forth below. An SSD writer/garbage-collector subsequently described.

Because SSDAlloc uses a log structured store and object locations may change on each write to the bulk erase memory, SSDAlloc uses a data structure called an Object Table to locate objects on the SSD. While the virtual memory addresses of the objects are their fixed locations, Object Tables store their ever-changing SSD locations. Object Tables are similar to page tables in traditional virtual memory systems. Each Object Table has a unique identifier called the OTID and it contains an array of integers representing the SSD locations of the objects it indexes. An object's Object Table Offset (OTO) is the offset in this array where its SSD location is stored. The 2-tuple <OTID, OTO> is the object's internal persistent pointer.

To efficiently fetch the objects from the SSD when they are not cached in RAM, it is possible to keep a mapping between each virtual address range (as allocated by the OPP or the MP memory manager) in use by the application and its corresponding Object Table, called an Address Translation Module (ATM). When the object of a page that is requested for materialization is not present in the RAM object cache, <OTID, OTO> of that object is determined from the page's address via an ATM lookup (shown in FIG. 1). Once the <OTID,OTO> is known, the object is fetched from the SSD, inserted into RAM object cache and the page is then materialized. The ATM is only used when the RAM object cache does not have the required objects. A successful lookup results in a materialized physical page that can be used without runtime system intervention for as long as the page resides in the Page Buffer. If the page that is requested does not belong to any allocated range, then the segmentation fault is a program error. In that case the control is returned to the originally installed seg-fault handler.

The ATM indexes and stores the 2-tuples <Virtual Memory Range, OTID> such that when it is queried with a virtual memory page address, it responds with the <OTID,OTO> of the object belonging to the page. In one implementation, a balanced binary search tree is used for various reasons—1) virtual memory range can be used as a key while the OTID can be used as a value. The search tree can be queried using an arbitrary page address and by using a binary search, one can determine the virtual memory range it belongs to. Using the queried page's offset into this range, the relevant object's OTO is determined, 2) it allows the virtual memory ranges to be of any size and 3) it provides a simple mechanism by which it is possible to improve the lookup performance—by reducing the number of Object Tables, there by reducing the number of entries in the binary search tree. Our heap manager which allocates virtual memory (in OPP or MP style) always tries to keep the number of virtual memory ranges in use to a minimum to reduce the number of Object Tables in use. Before describing an example heap manager design, a few optimizations to reduce the size of Object Tables are disclosed below.

It is desirable to store the Object Tables fully in DRAM to minimize multiple SSD accesses to read an object. Two important optimizations may be performed to reduce the size overhead from the Object Tables. First—to be able to index large SSDs for arbitrarily sized objects, one would need a 64 bit offset that would increase the DRAM overhead for storing Object Tables. Instead, is possible to store a 32 bit offset to an aligned 512 byte SSD sector that contains the start of the object. While objects may cross the 512 byte sector boundaries, the first two bytes in each sector are used to store the offset to the start of the first object starting in that sector. Each object's on-SSD metadata contains its size, using which, it is possible to then find the rest of the object boundaries in that sector. It is possible to index 2 TB of SSD this way. 40 bit offsets can be used for larger SSDs.

A second possible optimization addresses Object Table overhead from small objects. For example, four byte objects can create 100% DRAM overhead from their Object Table offsets. To reduce this overhead, object batching may be used, where small objects are batched into larger contiguous objects. It is possible to batch enough objects together such that the size of the larger object is at least 128 bytes (restricting the Object Table overhead to a small fraction—$\frac{1}{32}$). Pages, however, are materialized in regular OPP style—one small object per page. However, batched objects are internally maintained as a single object.

SSDAlloc's Heap Manager

Internally, SSDAlloc's virtual memory allocation mechanism works like a memory manager over large Object Table allocations (shown in FIG. 1). This ensures that a new Object Table is not created for every memory allocation. The Object Tables and their corresponding virtual memory ranges are created in bulk and memory managers allocate from these regions to increase ATM lookup efficiency. For example, two kinds of memory managers can be used—An object pool allocator which is used for individual allocations and a ptmalloc style coalescing memory manager. It may be desirable to keep the pool allocator separate from the coalescing allocator for the following reasons: 1) Many of our focus applications prefer pool allocators, so providing a pool allocator further eases their development, 2) Pool allocators reduce the number of page reads/writes by not requiring coalescing, and 3) Pool allocators can export simpler memory usage information, increasing garbage collector efficiency.

Object Pool Allocator: SSDAlloc provides an object pool allocator for allocating objects individually via OPP. Unlike traditional pool allocators, pools are not created for each object type, but instead pools are created of different size ranges. For example, all objects of size less than 0.5 KB are allocated from one pool, while objects with sizes between 0.5 KB and 1 KB are allocated from another pool. Such pools exist for every 0.5 KB size range, since OPP performs virtual memory operations at page granularity. Despite the pools using size ranges, it is possible to avoid wasting space by obtaining the actual object size from the application at allocation time, and using this size both when the object is stored in the RAM object cache, and when the object is written to the SSD. When reading an object from the SSD, the read is rounded to the pool size to avoid multiple small reads.

SSDAlloc maintains each pool as a free list—a pool starts with a single allocation of 128 objects (one Object Table, with pages contiguous in virtual address space) initially and doubles in size when it runs out of space (with a single Object Table and a contiguous virtual memory range). No space in the RAM object cache or the SSD is actually used when the size of pool is in creased, since only virtual address space is allocated. The pool stops doubling in size when it reaches a size of 10,000 (configurable) and starts linearly increasing in steps of 10,000 from then on. The free-list state of an object can be used to determine if an object on the SSD is garbage, enabling object-granularity garbage collection. This type of a separation of the heap-manager state from where the data is actually stored is similar to the "frameheap" implementation of Xerox Parc's Mesa and Cedar languages.

Like Object Tables, it is possible to maintain free-lists in DRAM, so the free list size is tied to the number of free objects, instead of the total number of objects. To reduce the size of the free list it is possible to do the following: the free list actively indexes the state of only one Object Table of each pool at any point of time, while the allocation state for the rest of the Object Tables in each pool is managed using a compact bitmap notation along with a count of free objects in each Object Table. When the heap manager cannot allocate from the current one, it simply changes the current Object Table's free list representation to a bitmap and moves on to the Object Table with the largest number of free objects, or it increases the size of the pool.

Coalescing Allocator: SSDAlloc's coalescing memory manager works by using memory managers like ptmalloc over large address spaces that have been reserved. In one implementation a simple bestfirst with coalescing memory manager over large pre-allocated address spaces is used, in steps of 10,000 (configurable) pages; no DRAM or SSD space is used for these pre-allocations, since only virtual address space is reserved. Each object/page allocated as part of the coalescing memory manager is given extra metadata space in the header of a page to hold the memory manager information (objects are then appropriately offset). OPP arrays of any size can be allocated by performing coalescing at the page granularity, since OPP arrays are simply arrays of pages. MP pages are treated like pages in the traditional virtual memory system. The memory manager works exactly like traditional malloc, coalescing freely at byte granularity. Thus, MP with our Coalescing Allocator can be used as a drop-in replacement for log-structured swap.

A dirty object evicted by RAM object cache needs to be written to the SSD's log and the new location has to be entered at its OTO. This means that the older location of the object has to be garbage collected. An OPP object on the SSD which is in a free-list also needs to be garbage-collected. Since SSDs do not have the mechanical delays associated with a moving disk head, it is possible to use a simpler garbage collector than the seek-optimized ones developed for disk-based log-structured file systems. The cleaner may perform a "read-modify-write" operation over the SSD sequentially—it reads any live objects at the head of the log, packs them together, and writes them along with flushed dirty objects from RAM.

SSDAlloc's Garbage Collector

The SSDAlloc Garbage Collector (GC) activates whenever the RAM object cache has evicted enough number of dirty objects (as shown in FIG. 1) to amortize the cost of writing to the SSD. It is possible to use a simple read-modify-write garbage collector, which reads enough partially-filled blocks (of configurable size, preferably large) at the head of the log to make space for the new writes. Each object on the SSD has its 2-tuple <OTID,OTO> and its size as the metadata, used to update the Object Table. This back pointer is also used to figure out if the object is garbage, by matching the location in the Object Table with the actual offset. To minimize the number of reads per iteration of the GC on the SSD, it is possible to maintain in RAM the amount of free space per 128 KB block. These numbers can be updated whenever an object in an erase block is moved elsewhere (live object migration for compaction), when a new object is written to it (for writing out dirty objects) or when the object is moved to a freelist (object is "free").

While the design so far focused on obtaining high performance from DRAM and flash in a hybrid setting, memory allocated via SSDAlloc is not non-volatile. An example durability framework to preserve application memory and state on the SSD is set forth below.

SSDAlloc's Durability Framework

SSDAlloc helps applications make their data persistent across reboots. Since SSDAlloc is designed to use much more SSD-backed memory than the RAM in the system, the runtime is expected to maintain the data persistent across reboots to avoid the loss of work.

SSDAlloc's checkpointing is a way to cleanly shutdown an SSDAlloc based application while making objects and metadata persistent to be used across reboots. Objects can be made persistent across application restarts and system reboots by simply flushing all the dirty objects from RAM object cache to the SSD. The state of the heap-manager, however, needs more support to be made persistent. The bitmap style free list representation of the OPP pool allocator makes the heap-manager representation of individually allocated OPP objects easy to be serialized to the SSD. However, the heap-manager information as stored by a coalescing memory manager used by the OPP based array allocator and the MP based memory allocator would need a full scan of the data on the SSD to be regenerated after a reboot. One implementation provides durability only for the individually allocated OPP objects. It is possible to provide durability for other types of SSDAlloc data as well.

durability for the heap-manager state of the individually allocated OPP objects is provided by reserving a known portion of the SSD for storing the corresponding Object Tables and the free list state (a bitmap). Since the maximum Object Table space to object size overhead ratio is 1/32, it is possible to reserve slightly more than 1/32 of the total SSD space (by using a file that occupies that much space) where the Object Tables and the free list state can be serialized for later use.

It should be possible to garbage collect dead objects across reboots. This is handled by making sure that our copy-and-compact garbage collector is always aware of all the OTIDs that are currently active within the SSDAlloc system. Any object with an unknown OTID is garbage collected. Additionally, any object with an OTID that is active is garbage collected only according to the criteria discussed above.

Virtual memory address ranges of each Object Table must be maintained across reboots, because checkpointed data might contain pointers to other checkpointed data. The virtual memory address range of each Object Table can be stored in the first object that this Object Table indexes. This object is written once at the time of creation of the Object Table and is not made available to the heap manager for allocation.

SSDAlloc's Overhead

The overhead introduced by the SSDAlloc's runtime mechanism is minor compared to the performance limits of today's high-end SSDs. The SSDAlloc's runtime mechanism was benchmarked on a test machine with a 2.4 GHz quad-core processor to verify this conclusion. To benchmark the latency overhead of the signal handling mechanism, 200 Million pages were protected. The maximum seg-fault generation rate was then measured. For measuring the ATM lookup latency, an ATM with a million entries was built. The maximum lookup throughput was then measured. To benchmark the latency of an on-demand page materialization of an object from the RAM object cache to a page within the Page Buffer, a page is populated with random data and the latency is measured. To benchmark the page dematerialization of a page from the Page Buffer to an object in the RAM object cache, the contents of the page are copied elsewhere, the page is madvised as not needed, the page is reprotected using mprotect and the total latency is measured. To benchmark the latency of TLB misses (through L3) a CPU benchmarking tool is used (Calibrator) by allocating 15 GB of memory per core. Table 4 presents the results. Latencies of all the overheads clearly indicate that they will not be a bottleneck even for the high-end SSDs like the FusionIO IOXtreme drives, which can provide up to 250,000 IOPS. In fact, one would need 5 such SSDs for the SSDAlloc runtime to saturate the CPU.

The largest CPU overhead is from the signal handling mechanism, which is present only because of a user space implementation. With an in kernel implementation, the VM pager can be used to manage the Page Buffer, which would further reduce the CPU usage. OPP was designed for applications with high read randomness without much locality, because of which, using OPP will not greatly increase the number of TLB (through L3) misses. Hence, applications that are not bottlenecked by DRAM (but by CPU, network, storage capacity, power consumption or magnetic disk) can replace DRAM with high-end SSDs via SSDAlloc and reduce hardware expenditure and power costs. For example, Facebook's memcache servers are bottlenecked by network parameters; their peak performance of 200,000 tps per server can be easily obtained by using today's high-end SSDs as RAM extension via SSDAlloc.

DRAM overhead created from the Object Tables is compensated by the performance gains. For example, a 300 GB SSD would need 10 GB and 300 MB of space for Object Tables when using OPP and MP respectively for creating 128 byte objects. However, SSDAlloc's random read/write performance when using OPP is 3.5 times better than when using MP. Additionally, for the same random write workload OPP generates 32 times less write traffic to the SSD when compared to MP and thereby increases the lifetime of the SSD. Additionally, with an in kernel implementation, either the page tables or the Object Tables will be used as they both serve the same purpose, further reducing the overhead of having the Object Tables in DRAM.

TABLE 4

| Overhead Source | Avg. Latency (μsec) |
| --- | --- |
| TLB Miss (DRAM read) | 0.014 |
| ATM Lookups | 0.046 |
| Page Materialization | 0.138 |
| Page Dematerialization | 0.172 |
| Signal Handling | 0.666 |
| Combined Overhead | 0.833 |

Table 4 shows that SSDAlloc's overheads are quite low, and place an upper limit of over 1 million operations per second using low-end server hardware. This request rate is much higher than even the higher-performance SSDs available today, and is higher than even what most server applications need from RAM.

Implementation and the API

An SSDAlloc prototype was implemented as a C++ library in roughly 10,000 lines of code. It currently supports SSD as the only form of flash memory, though it could later be expanded, if necessary, to support other forms of flash memory. In one implementation, applications can coexist by creating multiple files on the SSD. Alternatively, an application can use the entire SSD, as a raw disk device for high performance. While the such and implementation uses flash memory via an I/O controller such an overhead may be avoided in the future. An overview of the implementation via a description of the API is set forth below.

ssd_oalloc: void*ssd_oalloc(int numObjects, int objectSize): is used for OPP allocations—both individual and array allocations. If numObjects is 1 then the object is allocated from the in-built OPP pool allocator. If it is more than 1, it is allocated from the OPP coalescing memory manager.

ssd_malloc: void*ssd_malloc(size_t size): allocates size bytes of memory using the heap manager (described below) on MP pages. Similar calls exist for ssd calloc and ssd realloc.

ssd_free: void ssd_free(void*va_address): deallocates the objects whose virtual allocation address is va_address. If the allocation was via the pool allocator then the <OTID,OTO> of the object is added to the appropriate free list. In case of array allocations, the inbuilt memory manager frees the data according to our heap manager. SSDAlloc is designed to work with low level programming languages like 'C'. Hence, the onus of avoiding memory leaks and of freeing the data appropriately is on the application.

checkpoint: int checkpoint(char* filename): flushes all dirty objects to the SSD and writes all the Object Tables and free-lists of the application to the file filename. This call is used to make the objects of an application durable. restore: int restore(char* filename): It restores the SSDAlloc state for the calling application. It reads the file (filename) containing the Object Tables and the free list state needed by the application and mmaps the necessary address for each Object Table (using the first object entry) and then inserts the mappings into the ATM as described above.

Figure 2:
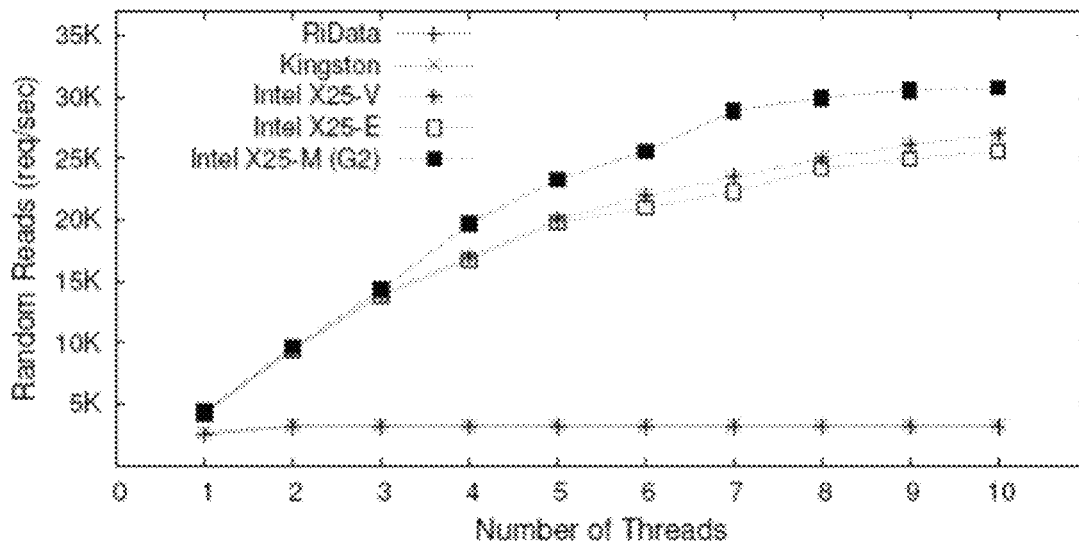
FIG. 2 is a graph showing how some high-end SSDs have internal parallelism.

SSDs scale performance with parallelism. FIG. 2 shows how some high-end SSDs have internal parallelism (for 0.5 KB reads, other read sizes also have parallelism). Additionally, multiple SSDs could be used with in an application. All SSDAlloc functions, including the heap manager, are implemented in a thread safe manner to be able to exploit the parallelism.

FIG. 2 shows that SSDAlloc's thread-safe memory allocators allow applications to exploit the full parallelism of many SSDs, which can yield significant performance advantages. This example shows the performance for 4 KB reads.

Migration to SSDAlloc

SSDAlloc is suited to the memory intensive portions of server applications with minimal to no locality of reference, and that migration should not be difficult in most cases—our experience suggests that only a small number of data types are responsible for most of the memory usage in these applications. The following scenarios of migration are possible for such applications to embrace SSDAlloc:

Replace all calls to malloc with ssd malloc: Application would then use the SSD as a log-structured page store and use the DRAM as a page cache. Application's performance would be better than when using the SSD via unmodified Linux swap because it would avoid random writes and circumvent other legacy swap system overheads that are more clearly quantified in FlashVM.

Replace all malloc calls made to allocate memory intensive datastructures of the application with ssd malloc: Application can then avoid SSDAlloc's runtime intervention (copying data between Page Buffer and RAM object cache) for non-memory intensive datastructures and can thereby slightly reduce its CPU utilization.

Replace all malloc calls made to allocate memory intensive datastructures of the application with ssd oalloc: Application would then use the SSD as a log-structured object store only for memory intensive objects. Application's performance would be better than when using the SSD as a log-structured swap because now the DRAM and the SSD would be managed at an object granularity.

In our evaluation of SSDAlloc, all the above migration scenarios were tested to estimate the methodology that provides the maximum benefit for applications in a hybrid DRAM/SSD setting.

Evaluation Results

SSDAlloc was evaluated using microbenchmarks and applications built or modified to use SSDAlloc. Microbenchmarks are used to test the limits of benefits from using SSDAlloc versus SSD-swap. The performance of memcached (with SSDAlloc and SSD-swap) was also evaluated since this is a popular key-value store used in datacenters. SSDs have been shown to minimize energy consumption in such applications. A B+Tree index was also benchmarked for SSDs, all calls to malloc were replaced with calls to ssd malloc to see the benefits and impact of an automated migration to SSDAlloc.

The performance of systems designed to use SSDAlloc are compared to the same system specifically customized to use the SSD directly, to evaluate the overhead from SSDAlloc's runtime. A network packet cache backend is also examined (built using transparent SSDAlloc techniques disclosed herein and also the non-transparent mechanisms). The performance of a web proxy/WAN accelerator cache index is examined for SSDs. The results demonstrate that using OPP makes efficient use of DRAM while providing high performance.

In all these experiments, applications were evaluated using three different allocation methods: SSD-swap (via malloc), MP or log-structured SSD-swap (via ssd malloc), OPP (via ssd oalloc). The evaluations use five kinds of SSDs and two types of servers. The SSDs and some of their performance characteristics are shown in Table 5. The two servers used had a single core 2 GHz CPU with 4 GB of RAM and a quad-core 2.4 GHz CPU with 16 GB of RAM respectively.

TABLE 5

|  | OPP | MP | SSD-swap |
|---|---|---|---|
| Average (µsec) | 257 | 468 | 624 |
| Std Dev (µsec) | 66 | 98 | 287 |

Table 5 shows response times for the OPP, MP and SSD-swap techniques. The OPP technique performs best, since it can make the best use of the block-level performance of the SSD whereas MP provides page-level performance. SSD-swap performs poorly due to worse write behavior.

Microbenchmarks

The performance of random reads and writes were evaluated in an SSD-augmented memory by accessing a large array of 128 byte objects—an array of total size of 32 GB using various SSDs. The accessible RAM in the system was restricted to 1.5 GB to test out-of-DRAM performance. Objects were randomly (read or write) accessed 2 million times per test. The array was allocated using four different methods—SSD-swap (via malloc), MP (via ssd malloc), OPP (via ssd oalloc). Object Tables for each of OPP, and MP occupy 1.1 GB and 34 MB respectively. Page Buffers were restricted to a size of 25 MB (it was sufficient to pin a page down while it was being accessed in an iteration). Remaining memory was used by the RAM object cache. To exploit the SSD's parallelism, 8-10 threads were used to perform the random accesses in parallel.

FIG. 3 shows microbenchmark results on 32 GB object (128 byte each) array. In (a), OPP works best (1.8-3.5 times over MP and 2.2-14.5 times over swap), MP and swap take a huge performance hit when write traffic increases. In (b), OPP, on all SSDs, trumps all other methods by reducing read and write traffic. In (c), OPP has the maximum write efficiency (31.5 times over MP and 1013 times over swap) by writing only dirty objects as opposed to writing full pages containing them.

Figure 3A:
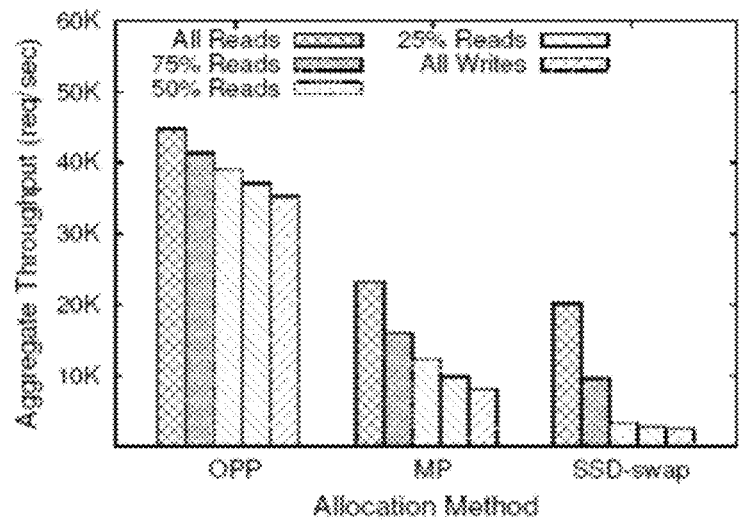
FIG. 3A is a graph showing throughput verses allocation method for the OPP, MP and SSD-swap allocation techniques for the Intel X25-E SSD.

FIG. 3a shows how (for the Intel X25-E SSD) allocating objects via OPP achieves much higher performance. OPP beats MP by a factor of 1.8-3.5 times depending on the write percentage and it beats SSDswap by a factor of 2.2-14.5 times. As the write traffic increases, MP and SSD-swap fare poorly due to reading/writing at a page granularity. OPP reads only 512 byte sector per object access as opposed to reading a 4 KB page; it dirties only 128 bytes as opposed to dirtying 4 KB per random write.

Figure 3B:
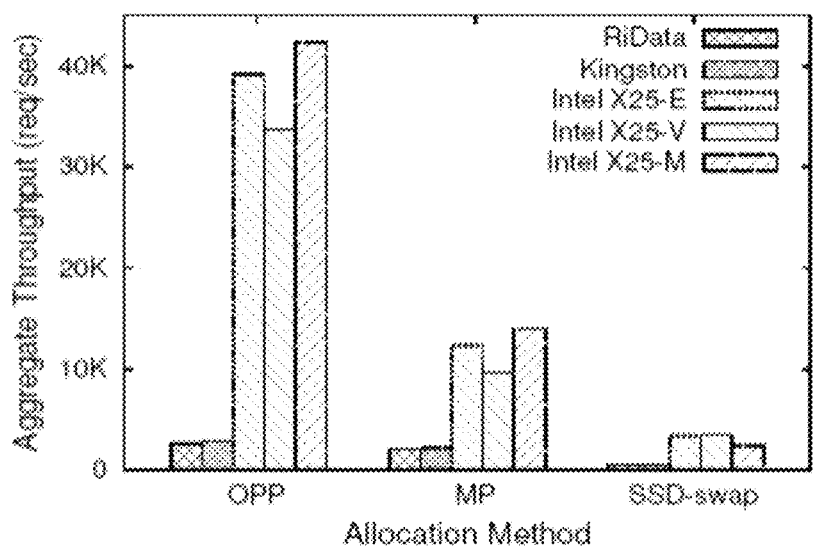
FIG. 3B is a graph showing throughput verses allocation method for the OPP, MP and SSD-swap allocation techniques with 50% reads.

FIG. 3b demonstrates how OPP performs better than all the allocation methods across all the SSDs when 50% of the operations are writes. OPP beats MP by a factor of 1.4-3.5 times and it beats SSD-swap by a factor of 5.5-17.4 times. Table 5 presents response time statistics when using the Intel X25-E SSD. OPP has the lowest averages and standard deviations. SSD-swap has a high average response time compared to OPP and MP. This is mainly because of storage sub-system inefficiencies and random writes.

Figure 3C:
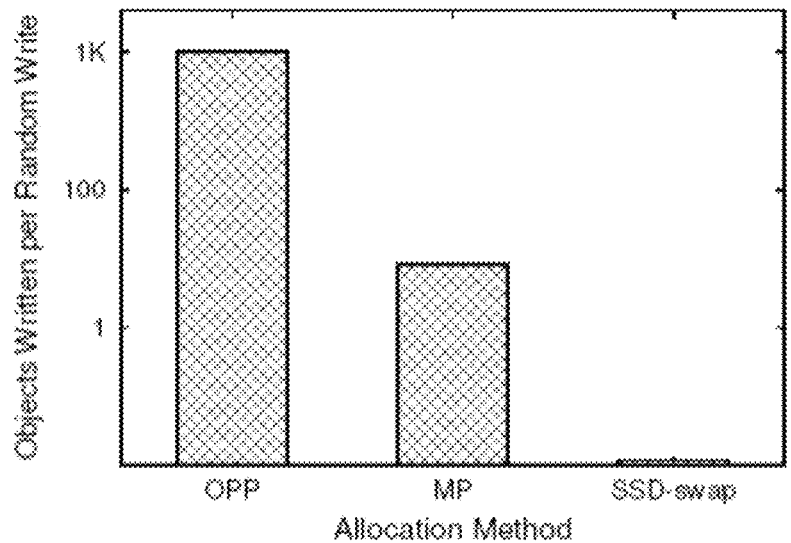
FIG. 3C is a graph showing write efficiency verses allocation method for the OPP, MP and SSD-swap allocation techniques.

FIG. 3c quantifies the write optimization obtained by using OPP in log scale. OPP writes at an object granularity, which means that it can fit more number of dirty objects in a given write buffer when compared to MP. When a 128 KB write buffer is used, OPP can fit nearly 1024 dirty objects in the write buffer while MP can fit only around 32 pages containing dirty objects. Hence, OPP writes more number of dirty objects to the SSD per random write when compared to both MP and SSDswap (which makes a random write for every dirty object). OPP writes 1013 times more efficiently compared to SSD-swap and 31.5 times compared to MP (factors independent of SSD make). Additionally, OPP not only increases write efficiency but also writes 31.5 times less data compared to MP and SSD-swap for the same workload by working at an object granularity and thereby increases the SSD lifetime by the same factor.

Overall, OPP trumps SSD-swap by huge gain factors. It also outperforms MP by large factors providing a good insight into the benefits that OPP would provide over log-structured swaps. Such benefits scale inversely with the size of the object. For example with 1 KB objects OPP beats MP by a factor of 1.6-2.8 and with 2 KB objects the factor is 1.4-2.3.

Memcached Benchmarks

To demonstrate the simplicity of SSDAlloc and its performance benefits for existing applications, memcached is modified. Memcached uses a custom slab allocator to allocate values and regular mallocs for keys. Memcache's slabs were replaced with OPP (ssd oalloc) and with MP (ssd malloc) to obtain two different versions. These changes required modifying 21 lines of code out of over 11,000 lines in the program. When using MP, malloc was replaced with ssd malloc inside memcache's slab allocator (used only for allocating values).

Figure 4A:
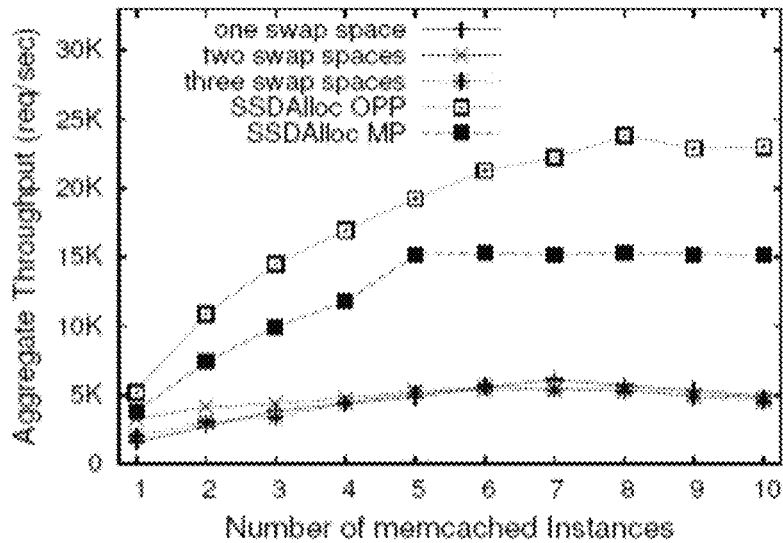
FIG. 4A is a graph showing aggregate throughput obtained using the OPP, MP and SSD-swap allocation techniques.
Figure 4B:
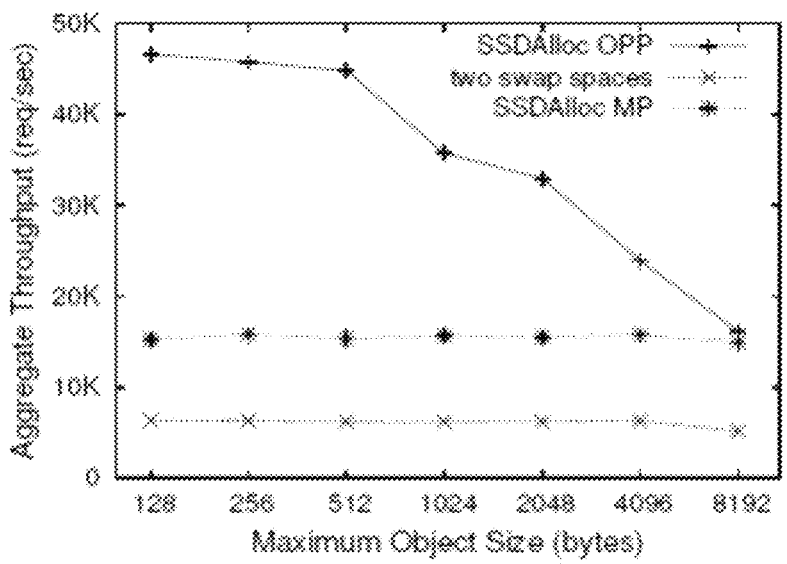
FIG. 4B is a graph showing aggregate throughput verses object size for the OPP, MP and SSD-swap allocation techniques.
Figure 4C:
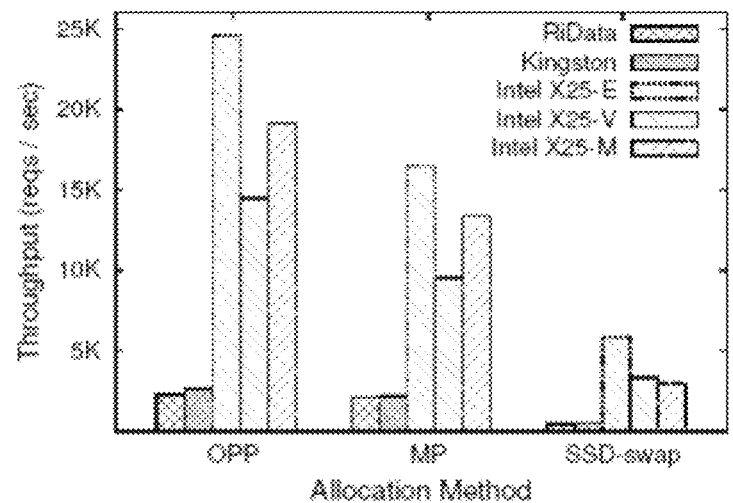
FIG. 4C is a graph showing is a graph showing aggregate throughput verses object size for the OPP, MP and SSD-swap allocation techniques.

These versions were compared with an unmodified memcached using SSD-swap. For SSDs with parallelism, multiple swap partitions were created on the same SSD. Multiple instances of memcached were run to exploit CPU and SSD parallelism. FIG. 4 shows memcached results. In FIG. 4a, OPP outperforms MP and SSD-swap by factors of 1.6 and 5.1 respectively (mix of 4 byte to 4 KB objects). In FIG. 4b, SSDAlloc's use of objects internally can yield dramatic benefits, especially for smaller memcached objects. In FIG. 4c, SSDAlloc beats SSD-Swap by a factor of 4.1 to 6.4 for memcached tests (mix of 4 byte to 4 KB objects).

In more detail, FIG. 4a shows the aggregate throughput obtained using a 32 GB Intel X25-E SSD (2.5 GB RAM), while varying the number of memcached instances used. Five different configurations were compared: memcached with OPP and MP, memcached with one, two and three swap partitions on the same SSD. For this experiment, memcached instances were populated with object sizes distributed uniformly randomly from 4 bytes to 4 KB such that the total size of objects inserted is 30 GB. For benchmarking, 1 million memcached get and set requests (100% hitrate) were generated each using four client machines that statically partition the keys and distribute their requests to all running memcached instances.

Results indicate that SSDAlloc's write aggregation is able to exploit the device's parallelism, while SSD-swap based memcached is restricted in performance, mainly due to the swap's random write behavior. OPP (at 8 instances of memcached) beats MP (at 6 instances of memcached) and SSD-swap (at 6 instances of memcached on two swap partitions) by factors of 1.6 and 5.1 respectively by working at an object granularity, for a mix of object sizes from 4 bytes to 4 KB. While using SSD-Swap with two partitions lowers the standard deviation of the response time, SSD-Swap had much higher variance in general. For SSD-Swap, the average response time was 667 microseconds and the standard deviation was 398 microseconds, as opposed to OPP's response times of 287 microseconds with a 112 microsecond standard deviation (high variance due to synchronous GC).

FIG. 4b shows how object size determines memcached performance with and without OPP (Intel X25-E SSD). Requests were generated over the entire workload without much locality. The aggregate throughput was measured while varying the maximum object size (actual sizes are distributed uniformly from 128 bytes to limit). This experiment was performed for three settings—1) Eight memcached instances with OPP, 2) Six memcached instances with MP and 3) Six memcached instances with two swap partitions. The number of instances was picked from the best performing numbers obtained from the previous experiment. The results show that as the object size decreases, memcached with OPP performs much better than when compared to memcached with SSD-swap and MP. This is due to the fact that using OPP moves objects to/from the SSD, instead of pages, resulting in smaller reads and writes. The slight drop in performance in case of MP and SSD-swap when moving from 4 KB object size limit to 8 KB is because the runtime sometimes issues two reads for objects larger than 4 KB. When the Object Table indicates that they are contiguous on SSD, they can be fetched together. In comparison, SSD-swap prefetches when possible.

FIG. 4c quantifies these gains for various SSDs (objects between 4 byte and 4 KB) at a high insert rate of 50%. The benefits of OPP can be anywhere between 4.1-6.4 times higher than SSD-swap and 1.2-1.5 times higher than MP (log-structured swap). For smaller objects (each 0.5 KB) the gains are 1.3-3.2 and 4.9-16.4 times respectively over MP and SSD-swap (16.4 factor improvement is achieved on the Intel X25-V SSD). Also, depending on object size distribution, OPP writes anywhere between 3.88-31.6 times more efficiently when compared to MP and 24.71-1007 times compared to SSD-swap (objects written per SSD write). The total write traffic of OPP is also between 3.88-31.6 times less when compared to MP and SSD-swap, increasing the lifetime and reliability of the SSD.

Packet Cache Benchmarks

Packet caches (and chunk caches) built using SSDs scale the performance of network accelerators and inline data deduplicators by exploiting good random read performance and large capacity of flash. Similar capacity DRAM-only systems will cost much more and also consume more power. A packet cache backend was built and configured to index a packet with the SHA1 hash of its contents (using a hash table). The backend was built using two methods—1) packets allocated via OPP (ssd oalloc), and 2) packets allocated via the non-transparent object get/put based SSDAlloc—where the SSD is used directly without any runtime intervention. Remaining data structures in both the systems were allocated via malloc. The two implementations were compared to estimate the overhead from SSDAlloc's runtime mechanism for each packet accessed.

For the comparison, the response times of packet get/put operations into the backend were tested. In such testing, many settings may be considered. For example, it is possible to vary the size of the packet from 100 to 1500 bytes. In another setting a mix of packet sizes (uniformly, from 100 to 1500 bytes) may be used. In one example, a 20 byte SHA1 hash of the packet was used as the key that is stored in the hashtable (in DRAM) against the packet as the value (on SSD)—the cache is managed in LRU fashion. random packet content can be generated from "/dev/random". In one example an Intel X25-M SSD and the high-end CPU machine was used (with eight threads for exploiting device parallelism). The SSD was filled with 32 GB worth of packets and then 2 million lookups and inserts (after evicting older packets in LRU fashion) are performed. In this benchmark, the Page Buffer is configured to hold only a handful of packets such that every page get/put request leads to a signal raise, and an ATM lookup followed by an OPP page materialization.

Figure 5A:
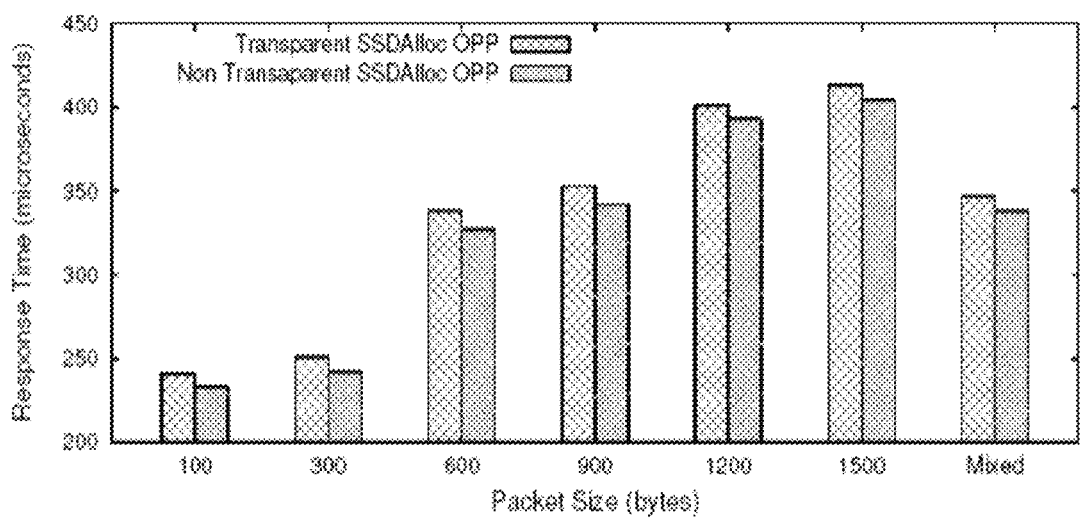
FIG. 5A is a graph showing response time verses packet size for transparent and non-transparent calls using the OPP technique.
Figure 5B:
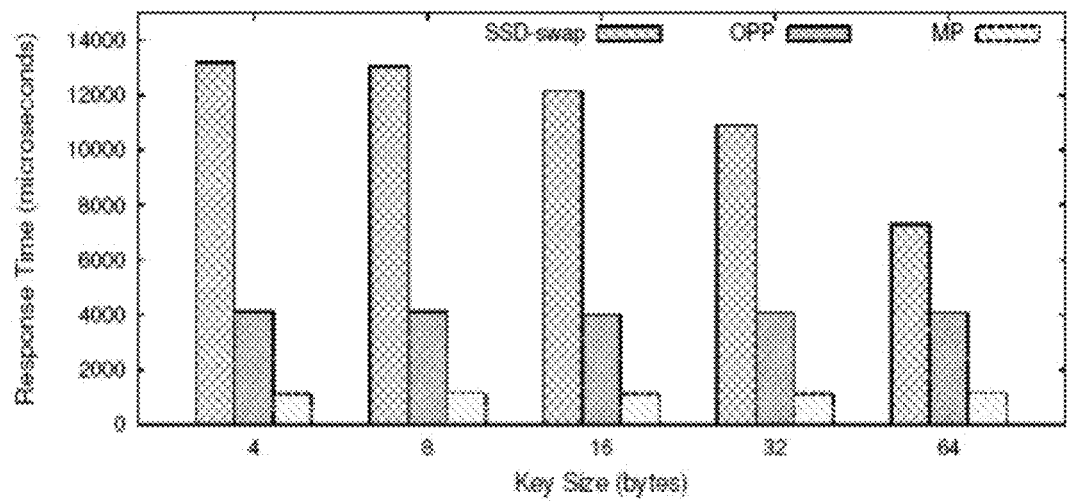
FIG. 5B is a graph showing response time verses key size for the OPP, MP and SSD-swap allocation techniques.

FIG. 5: Packet Cache Benchmarks: In FIG. 5a SSDAlloc's runtime mechanism adds only up to 20 microseconds of latency overhead, while there was no significant difference in throughput. B+Tree Benchmarks: In FIG. 5b, SSDAlloc's ability to internally use objects beats page-sized operations of MP or SSD-swap.

In more detail, FIG. 5a compares the response times of OPP method using the transparent techniques described herein and non-transparent calls. The results indicate that the overhead from SSDAlloc's runtime mechanism is only on the order of ten microseconds, there is no significant difference in throughput. Highest overhead observed was for 100 byte packets, where transparent SSDAlloc consumed 6.5% more CPU than the custom SSD usage approach when running at 38K 100 byte packets per second (30.4 Mbps). It is believed that this overhead is acceptable given the ease of development. The packet cache was built by allocating packets via MP (ssd malloc) and SSD-swap (malloc). OPP based packet cache performed 1.3-2.3 times better than an MP based one and 4.8-10.1 times better than SSD-swap for mixed packets (from 100 to 1500 bytes) across all SSDs. Write efficiency of OPP scaled according to the packet size as opposed to MP and SSD-swap which always write a full page (either for writing a new packet or for editing the heap manager data by calling ssd free or free). Using an OPP packet cache, three Intel SSDs can accelerate a 1 Gbps link (1500 byte packets at 100% hit rate). Whereas, MP and SSD-swap would need 5 and 12 SSDs respectively.

B+Tree Benchmarks

A B+Tree data structure was built using a Boost framework using the in-built Boost object pool allocator (which uses malloc internally). The B+Tree data structure was ported to SSDAlloc OPP (in 15 lines of code) by replacing calls to object pool with ssd oalloc. The B+Tree data structure was also ported to MP by replacing all calls to malloc (inside object pool) with ssd malloc (in 6 lines of code). Hence, in the MP version, every access to memory happens via the SSDAlloc's runtime mechanism.

The Intel X25-V SSD (40 GB) was used for the experiments. The amount of memory in the system was restricted to 256 MB for both the systems to test out-of-DRAM behavior. Up to 25 keys were allowed to be stored per inner node and up to 25 values stored in the leaf node. The key size was varies. The B+Tree was populated such that it has 200 million keys, to make sure that the height of the B+Tree is at least 5. The size of the key was varied so that the size of the inner object and leaf node object varied. 2 million updates were performed (values are updated) and lookups.

FIG. 5(b) shows that MP and OPP provide much higher performance than using SSD-swap. As the key size increases from 4 to 64 bytes, the size of the nodes increases from 216 bytes to 1812 bytes. The performance of SSD-swap and MP is constant in all cases (with MP performing 3.8 times better than SSD-swap with log-structured writes) because they access a full page for almost every node access, regardless of node size, increasing the size of the total dirty data, thereby performing more erasures on the SSD. OPP, in comparison, makes smaller reads when the node size is small and its performance scales with the key size in the B+Tree. Across SSDs, B+Tree operations via OPP were 1.4-3.2 times faster when compared to MP and 4.3-12.7 times faster than when compared to SSD-swap (for a 64 byte key). In the next evaluation setting, it is demonstrated how OPP makes the best use of DRAM transparently.

HashCache Benchmarks

The final application benchmark is the efficient Web cache/WAN accelerator index based on HashCache. HashCache is an efficient hash table representation that is devoid of pointers; it is a set-associative cache index with an array of sets, each containing the membership information of a certain (usually 8-16) number of elements currently residing in the cache. An SSD backed index for performing HTTP caching and WAN Acceleration is used for developing regions. SSD backed indexes for WAN accelerators and data deduplicators are interesting because only flash can provide the necessary capacity and performance to store indexes for large workloads. A netbook with multiple external USB hard drives (up to a terabyte) can act as a caching server. The inbuilt DRAM of 1-2 GB would not be enough to index a terabyte hard drive in memory, hence, SSDAlloc can be used in those settings—the internal SSD can be used as a RAM supplement which can provide the necessary index lookup bandwidth needed for WAN Accelerators which make many index lookups per HTTP object.

An SSD based HashCache index was created for 3 billion entries using 32 GB SSD space. In creating the index, HashCache creates a large contiguous array of 128 byte sets. Each set can hold information for sixteen elements—hashes for testing membership, LRU usage information for cache maintenance and a four byte location of the cached object. Three configurations of HashCache were tested: with OPP (via ssd oalloc), MP (via ssd malloc) and SSD-swap (via malloc) to create the sets. In total, 28 lines of code were modified for these modifications. While using OPP, Checkpointing was used. This enables quick rebooting of the cache in case of power outages (netbooks have batteries and a graceful shutdown is possible in case of power outages).

Figure 6:
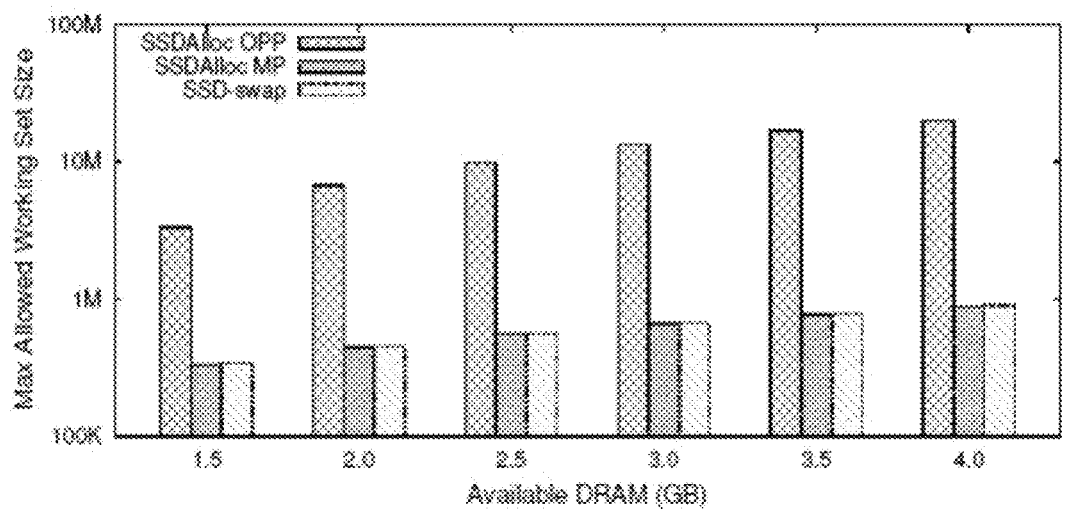
FIG. 6 is a graph showing max working set size verse available DRAM for the OPP, MP and SSD-swap allocation techniques.

FIG. 6 shows HashCache benchmarks: SSDAlloc OPP option can beat MP and SSD-Swap on RAM requirements due to caching objects instead of pages. The maximum size of a completely random working set of index entries each allocation method can cache in DRAM is shown (in log scale).

In more detail, FIG. 6(a) shows, in log scale, the maximum number of useful index entries of a web workload (highly random) that can reside in RAM for each allocation method. With available DRAM varying from 2 GB to 4.5 GB, the results show how OPP uses DRAM more efficiently than MP and SSD-swap. Even though OPP's Object Table uses almost 1 GB more DRAM than MP's Object Table, OPP still is able to hold much larger working set of index entries. This is because OPP caches at set granularity while MP caches at a page granularity, and HashCache has almost no locality. Being able to hold the entire working set in memory is very important for the performance of a cache, since it not only saves write traffic but also improves the index response time.

Reboot and recovery time measurements are also presented. Rebooting the version of HashCache built with OPP Checkpointing for a 32 GB index (1.1 GB Object Table) took 17.66 sec for the Kingston SSD (which has a sequential read speed of 70 MBPS).

Performance improvements from using OPP over MP and SSD-swap across SSDs are also reported. For SSDs with parallelism, the index horizontally was partitioned across multiple threads. The main observation is that using MP or SSD-swap would not only reduce performance but also undermine reliability by writing more number of times and more data to the SSD. OPP's performance is 5.3-17.1 times higher than when using SSDSwap, and 1.3-3.3 times higher than when using MP across SSDs (50% insert rate).

Operation of a Virtual Address Pager

It should be understood that any flowcharts contained herein are illustrative only and that other program entry and exit points, time out functions, error checking routines and the like (not shown) would normally be implemented in typical system software. It is also understood that system software may run continuously after being launched. Accordingly, any beginning and ending points are intended to indicate logical beginning and ending points of a portion of code that can be integrated with other portions of code and executed as needed. The order of execution of any of the blocks may also be varied without departing from the scope of this disclosure. Implementation of these aspects is readily apparent and well within the grasp of those skilled in the art based on the disclosure herein.

Figure 7A:
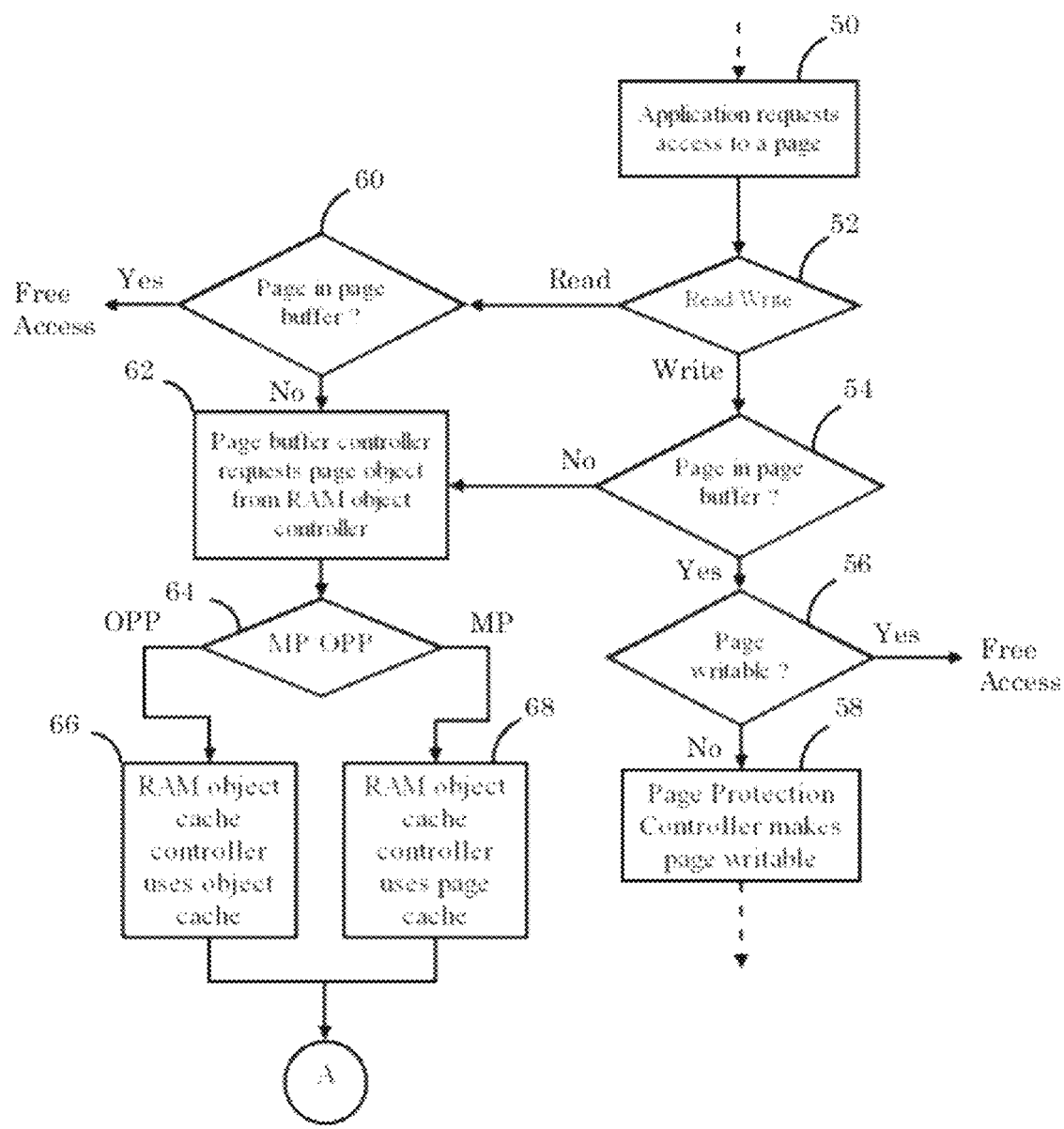
FIGS. 7A and 7B are flowcharts showing operation of a virtual address pager when an application accesses a page.
Figure 7B:
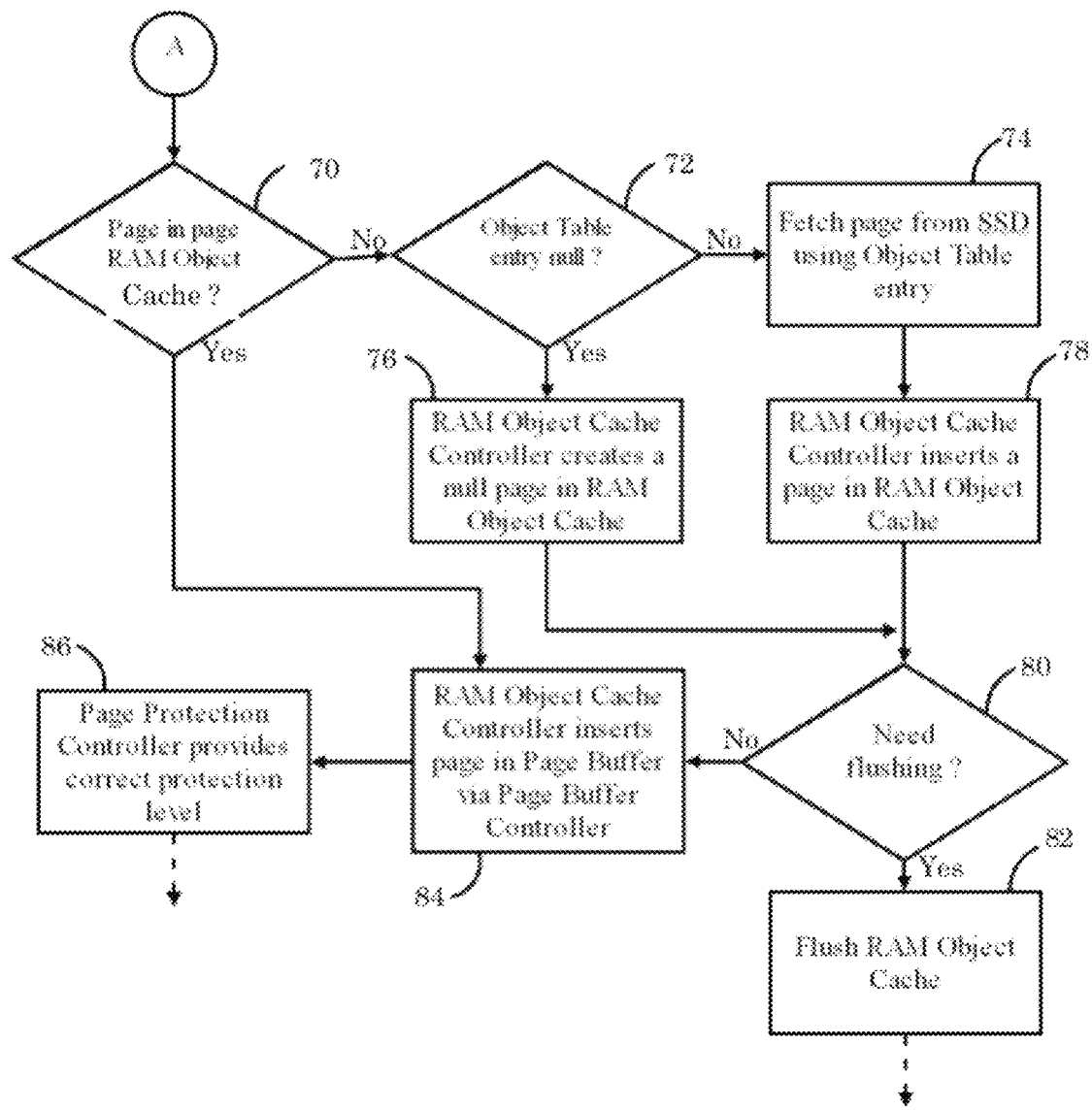

FIGS. 7A and 7B are flowcharts showing operation of a virtual address pager when an application accesses a page. A given application seeks access to a page as shown by block 50. Read and write operations are handled separately as shown by block 52. For write operations, control is passed to block 54. If the page is in the Page Buffer 34, then control is passed to block 56. If the page is writable, the application is given free access to the page as shown by block 56. If the page is not writable then the Page Protection Controller 21 makes the page writable as shown by block 58. The application is then given access the page. If the page is not in the Page Buffer 34, the control is passed to block 64 discussed below.

For read operations, if the page is in the Page Buffer 34, then the application is given free access to the page as shown by block 60. Otherwise, the Page Buffer Controller 24 requests the page or object from the RAM Object Cache Controller 26 as shown by block 62. MP and OPP operations are handled separately as shown by block 64. For OPP operations, the RAM Object Cache Controller 26 uses an object cache (see block 38 in FIG. 1A) as shown by block 66. For MP operations, the RAM Object Cache Controller 26 uses a page cache (see block 34 in FIG. 1A).

Continuing with FIG. 7B, block 70, if the page/object is in the RAM Object Cache 36, control is passed to block 84 as discussed below. If the page/object is not in the RAM Object Cache 36, control is passed to block 72. If the Object Table entry is null, the RAM Object Cache Controller 26 creates a null page in the RAM Object Cache 36. Otherwise control is passed to block 80 discussed below. If the Object Table entry is not null, the page is fetch from the bulk erase memory, e.g., SSD, via the Object Table entry as shown by block 74. The RAM Object Cache Controller 26 inserts a page in the RAM Object Cache 36 as shown by block 78. If the RAM Object Cache needs flushing (block 80), then a flush operation is carried out as shown by block 82. Otherwise control is passed to block 84. If the page/object is not in the RAM Object Cache 36, control is passed to block 84. The RAM Object Cache Controller 26 inserts the page in the Page Buffer 34 via the Page Buffer Controller 24. The Page Protection Controller 21 provides the correct level of protection for the page as shown by block 86.

Figure 8:
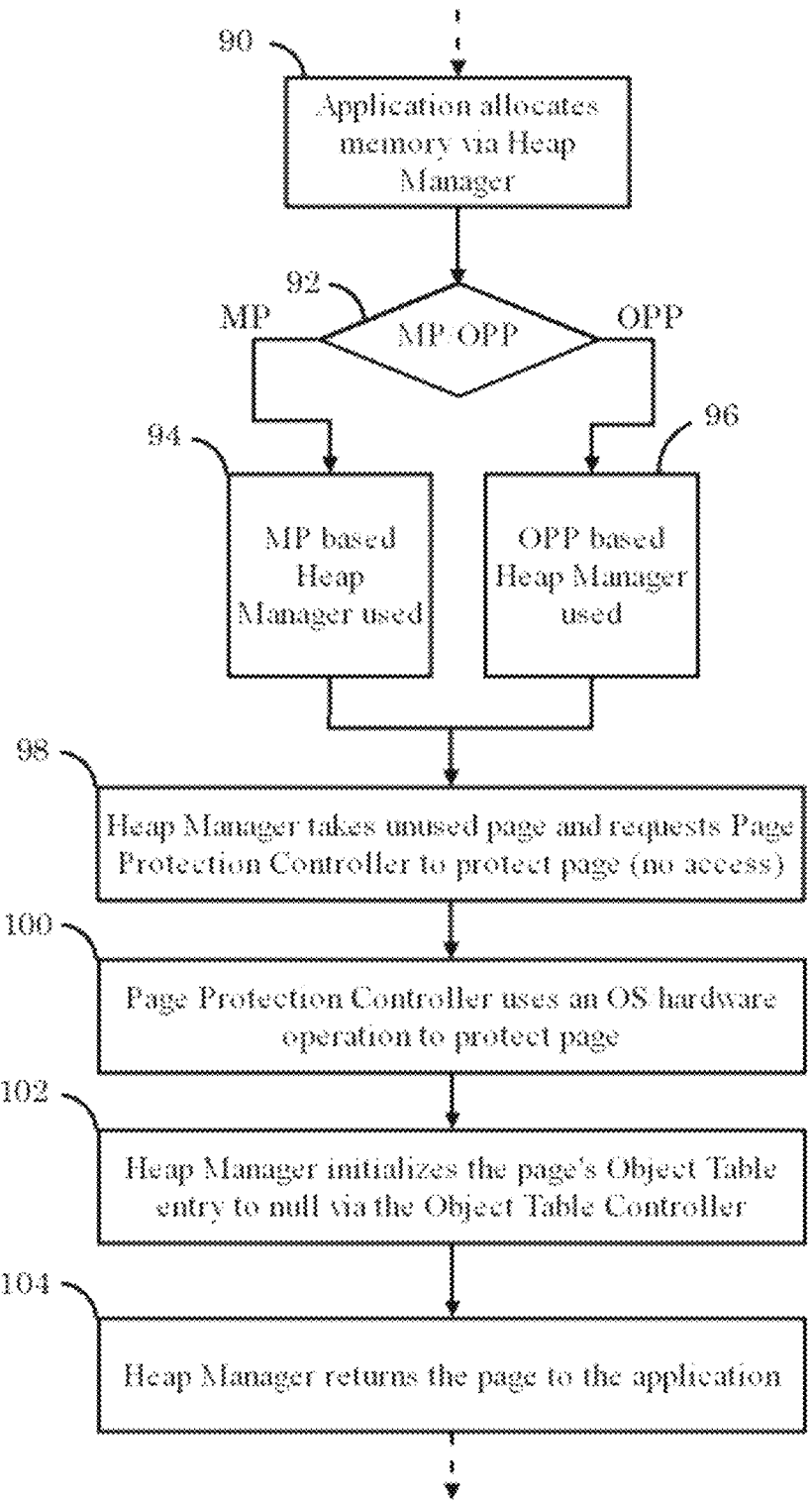
FIG. 8 is a flowchart showing operation of a virtual address pager during memory allocation.

FIG. 8 is a flowchart showing operation of a virtual address pager during memory allocation. The application allocates memory via the Heap Manager 32 as shown by block 90. MP and OPP operations are handled separately as shown by block 92. For MP operations, an MP based Heap Manager is used as shown by block 94. For OPP operations, an OPP based Heap Manager is used as shown by block 96. The Heap Manager 32 takes an unused page and requests the Page Protection Controller 21 to protect the page (no access) as shown by block 98. The Page Protection Controller 21 uses an OS/Hardware operation to protect the page as shown by block 100. The Heap Manager 32 initializes the page's Object Table entry to null as shown by block 102. The Heap Manager 32 then returns the page to the application as shown by block 104.

Figure 9:
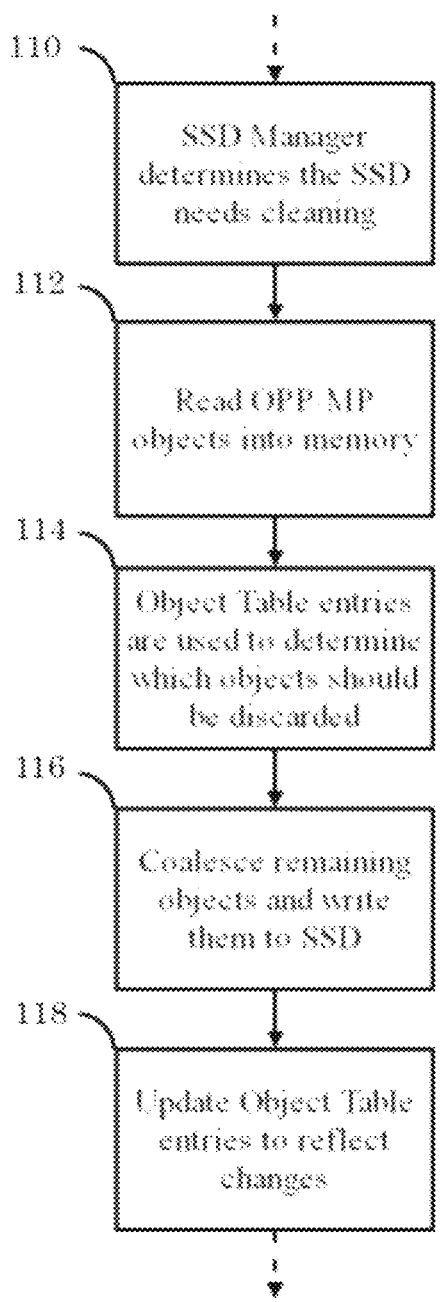
FIG. 9 is a flowchart showing operation of a virtual address pager during cleaning of a bulk erase memory such as an SSD.

FIG. 9 is a flowchart showing operation of a virtual address pager during cleaning of a bulk erase memory such as an SSD. The SSD Manager 40 determines that the bulk erase memory, e.g., SSD, needs cleaning as shown by block 110. The OPP/MP objects/pages are read into the bulk erase memory as shown by block 112. The SSD Manager 40 uses the Object Table entries to determine which objects should be discarded as shown by block 114. The SSD Manager 40 coalesces the remaining objects and writes them to the bulk erase memory as shown by block 116. The SSD Manager 40 then updates the Object Tables (see block 38 in FIG. 1A) to reflect the changes.

Figure 10:
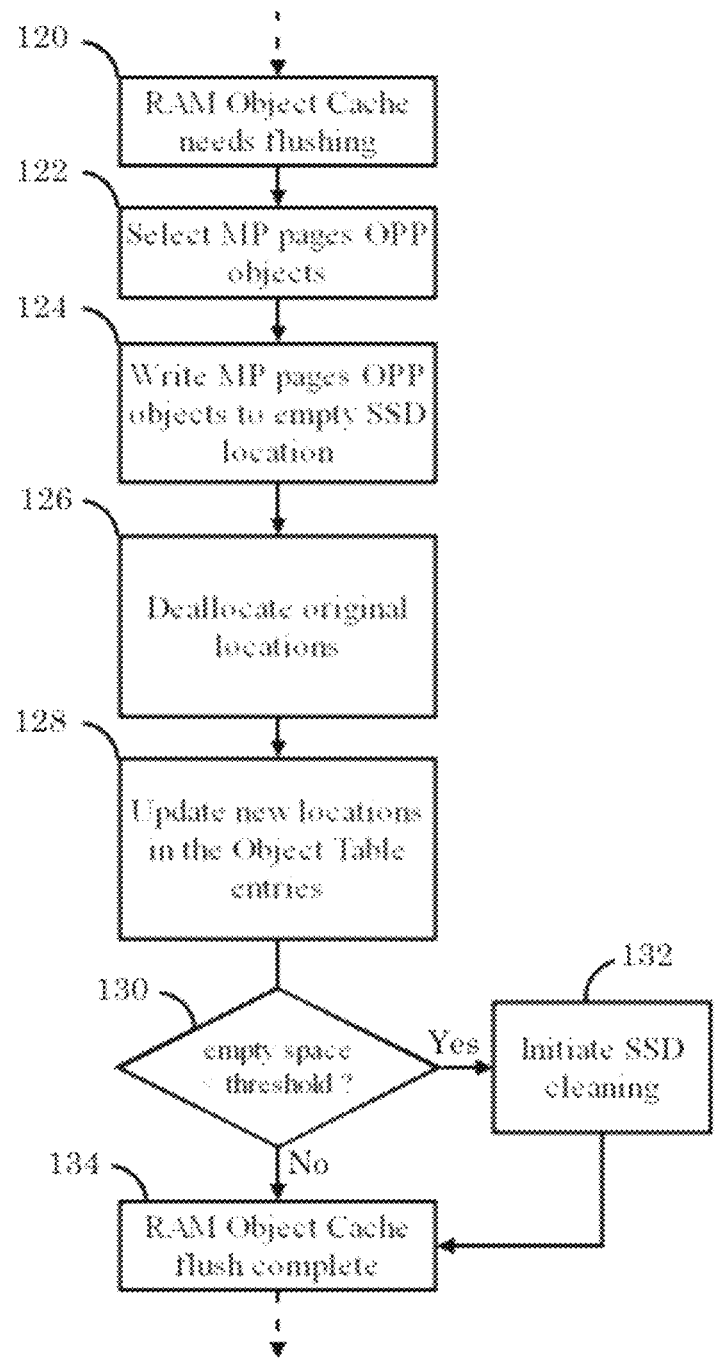
FIG. 10 is a flowchart showing operation of a virtual address pager during a RAM Object Cache flush.

FIG. 10 is a flowchart showing operation of a virtual address pager during a RAM Object Cache flush. The RAM Object Cache Controller 26 determines that the RAM Object Cache 36 needs flushing as shown by block 120. The RAM Object Cache Controller 26 selects at least a portion of the MP pages/OPP objects as shown by block 122. The RAM Object Cache Controller 26 writes the MP pages/OPP objects to an empty portion of the bulk erase memory as shown by block 124. The RAM Object Cache Controller 26 deallocates the original locations as shown by block 126. The RAM Object Cache Controller 26 updates the new locations in the Object Table entries as shown by block 128. If the remaining empty space on the bulk erase memory falls below a threshold, cleaning is initiated as shown by blocks 130 and 132. Otherwise the RAM Object Cache flush is complete as shown by block 134.

Figure 11:
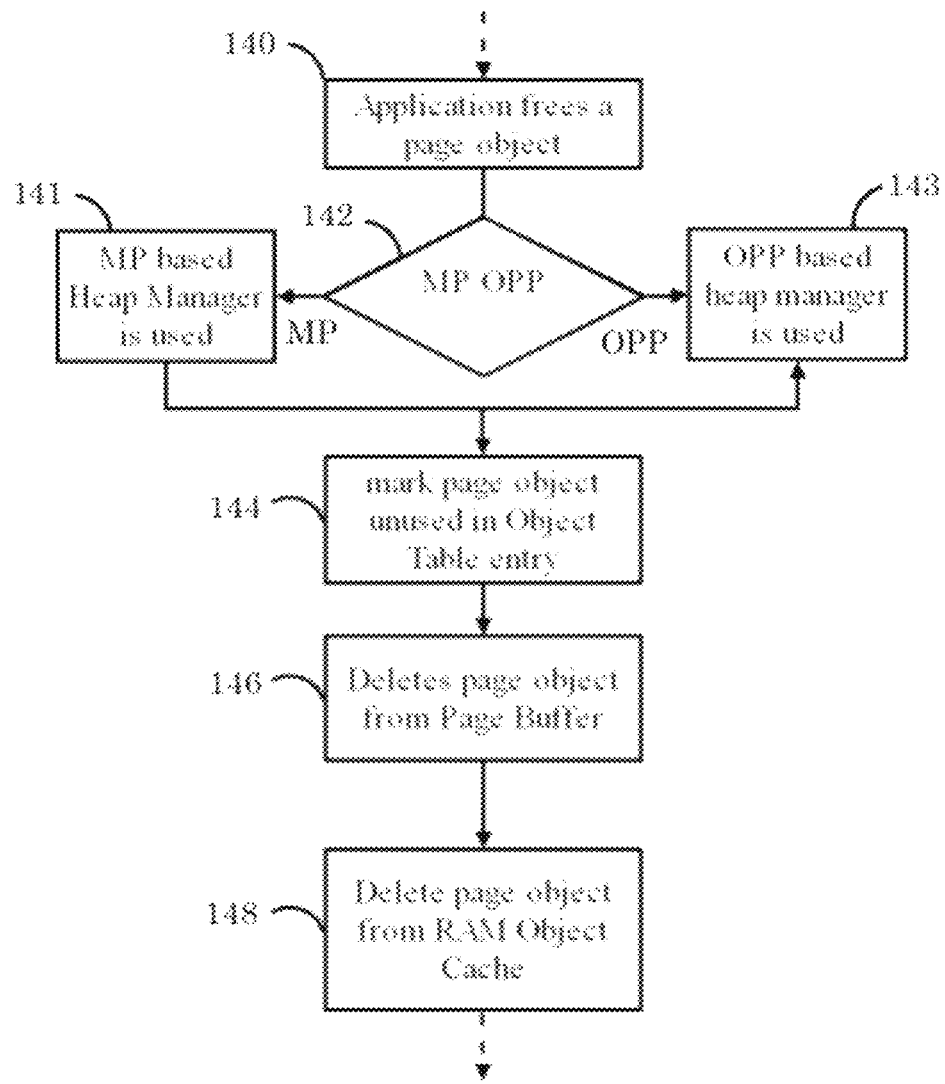
FIG. 11 is a flowchart showing operation of a virtual address pager when an application frees a page/object.

FIG. 11 is a flowchart showing operation of a virtual address pager when an application frees a page/object. The application requests that a given page/object should be freed as shown by block 140. MP and OPP operations are handled separately as shown by block 142. For MP operations, an MP based Heap Manager is used as shown by block 141. For OPP operations, an OPP based Heap Manager is used as shown by block 143. The Heap Manager 32 marks the page/object as unused in its associated Object Table entry as shown by block 144. The Page Buffer Controller 24 deletes the page/object from the Page Buffer 34 as shown by block 146. The RAM Object Cache Controller 26 deletes the page/object from the RAM Object Cache 36 as shown by block 148.

CONCLUSION

SSDAlloc provides a hybrid memory management system that allows new and existing applications to easily use SSDs to extend the RAM in a system, while performing up to 17 times better than SSD-swap, up to 3.5 times better than log-structured SSD-swap and increasing the SSD's lifetime by a factor of up to 30 with minimal code changes, limited to memory allocation. The performance of SSDAlloc applications is close to that of custom developed SSD applications. The benefits of SSDAlloc is demonstrated in a variety of contexts—a data center application (memcached), a B+Tree index, a packet cache backend and an efficient hashtable representation (HashCache), which required only minimal code changes, little application knowledge, and no expertise in the inner workings of SSDs.

It should be understood that many variations are possible based on the disclosure herein. Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks, SSDs and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

What is claimed is:

1. A virtual address pager for use with a bulk erase memory comprising:
   a page protection controller configured to respond to a page fault and being configured with a heap manager interface configured to allocate virtual memory using the bulk erase memory to augment DRAM, wherein the bulk erase memory is a solid state disk, and to receive only bulk erase memory-backed page requests for a plurality of memory pages;
   a RAM object cache controller configured to store and bulk write data for a portion of the bulk erase memory; and
   wherein the heap manager interface is connected to a heap manager and the heap manager uses an Object Per Page (OPP) model so that if an application requests memory for an object, the object is placed on its own page of the virtual memory using the disk, and wherein contiguous pages in the virtual memory are allocated initially by the Object Per Page (OPP) model.

2. The virtual address pager of claim 1, wherein the page protection controller has an operating system interface configured to generate a page memory access permission for each of the plurality of memory pages.

3. The virtual address pager of claim 2, wherein the page protection controller is configured to receive a virtual memory allocation request and generate the page memory access permission based on the virtual memory allocation request.

4. The virtual address pager of claim 3, further comprising a page buffer controller configured to populate a portion of a page based on the virtual memory allocation request.

5. The virtual address pager of claim 4, wherein the page buffer controller is configured to deallocate the page and store in the RAM object cache controller only the portion of the page specified by the virtual memory allocation request.

6. The virtual address pager of claim 5, wherein the virtual memory allocation request includes an object size and the page buffer controller is configured to populate the page based on the object size.

7. The virtual address pager of claim 6, wherein the page has a size and the object size is less than the page size.

8. The virtual address pager of claim 7, wherein the page buffer controller is configured to deallocate the page based on the object size.

9. The virtual address pager of claim 1, further comprising a page buffer controller configured to communicate with a page buffer, wherein the RAM object cache controller is configured to communicate with a RAM object cache, wherein the RAM object cache being larger than the page buffer.

10. The virtual address pager of claim 4, wherein the populated portion of the page is blank for a first access or a verbatim copy of object contents from when the page was last deallocated.

11. The virtual address pager of claim 1, wherein the virtual address pager may be implemented in an application, in libraries linked to the application, in a separate process communicating with the application or within an operating system or variations thereof.

12. The virtual address pager of claim 1, wherein the bulk erase memory is configured as a log structured store.

13. A method of virtual address paging for use with a bulk erase memory, the method comprising:
   detecting a page fault;
   receiving only bulk erase memory-backed page requests for a plurality of memory pages to allocate virtual memory using the bulk erase memory to augment DRAM, wherein the bulk erase memory is a solid state disk; and
   storing and bulk writing data for a portion of the bulk erase memory using an Object Per Page (OPP) model so that if an application requests memory for an object, the object is placed on its own page of the virtual memory using the disk, and wherein contiguous pages in the virtual memory are allocated initially by the Object Per Page (OPP) model.

14. The method of claim 13, further comprising generating a page memory access permission for each of the plurality of memory pages.

15. The method of claim 14, further comprising receiving a virtual memory allocation request and generating the page memory access permission based on the virtual memory allocation request.

16. The method of claim 15, further comprising populating a portion of a page based on the virtual memory allocation request.

17. The method of claim 16, further comprising deallocating the page and storing only the portion of the page specified by the virtual memory allocation request.

18. The method of claim 17, wherein the virtual memory allocation request includes an object size and the page is populated based on the object size.

19. The method of claim 18, wherein the page has a size and the object size is less than the page size.

20. The method of claim 19, further comprising deallocating the page based on the object size.

21. The method of claim 13, further comprising providing a page buffer controller configured to communicate with a page buffer and a RAM object cache controller configured to communicate with a RAM object cache, wherein the RAM object cache is larger than the page buffer.

22. The method of claim 16, wherein the populated portion of the page is blank for a first access or a verbatim copy of object contents from when the page was last deallocated.

23. The method of claim 13, wherein the bulk erase memory is configured as a log structured store.

24. A computer readable medium having stored thereon a computer program for execution by a processor configured to perform a method of virtual address paging for use with a bulk erase memory, the method comprising:
   detecting a page fault;
   receiving only bulk erase memory-backed page requests for a plurality of memory pages to allocate virtual memory using the bulk erase memory to augment DRAM, wherein the bulk erase memory is a solid state disk; and
   storing and bulk writing data for a portion of the bulk erase memory using an Object Per Page (OPP) model so that if an application requests memory for an object, the object is placed on its own page of the virtual memory using the disk, and wherein contiguous pages in the virtual memory are allocated initially by the Object Per Page (OPP) model.

25. A flash memory manager comprising:
   a page-based virtual memory manager interface configured to allocate virtual memory using the flash memory to augment DRAM; and
   an Object Per Page (OPP) memory manager for the page-based virtual memory manager interface and configured so that if an application requests memory for an object, the object is placed on its own page of the virtual memory using the flash memory, and wherein contiguous pages in the virtual memory are allocated initially by the Object Per Page (OPP) model.

26. The flash memory manager of claim 25 wherein a RAM object cache is being managed as a LRU (Least Recently Used) cache.

27. The flash memory manager of claim 26 wherein the flash memory comprises a SSD.

* * * * *